US012541760B2

(12) United States Patent
Dill et al.

(10) Patent No.: US 12,541,760 B2
(45) Date of Patent: Feb. 3, 2026

(54) MULTIFUNCTIONAL USER DEVICE

(71) Applicant: Visa International Service Association, San Francisco, CA (US)

(72) Inventors: Matthew Dill, San Francisco, CA (US); Girish Pandey, NY, NY (US); Brendan Grant, San Francisco, CA (US); Rubail Birwadker, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 397 days.

(21) Appl. No.: 17/799,758

(22) PCT Filed: Jun. 10, 2021

(86) PCT No.: PCT/US2021/036867
§ 371 (c)(1),
(2) Date: Aug. 15, 2022

(87) PCT Pub. No.: WO2021/252796
PCT Pub. Date: Dec. 16, 2021

(65) Prior Publication Data
US 2023/0072087 A1    Mar. 9, 2023

Related U.S. Application Data

(60) Provisional application No. 63/038,629, filed on Jun. 12, 2020.

(51) Int. Cl.
*G06Q 20/40* (2012.01)
*G06Q 20/34* (2012.01)
(Continued)

(52) U.S. Cl.
CPC ......... *G06Q 20/401* (2013.01); *G06Q 20/353* (2013.01); *G06Q 20/3676* (2013.01); *G06Q 20/3825* (2013.01); *G06Q 2220/00* (2013.01)

(58) Field of Classification Search
CPC ................ G06Q 20/00–425; H04L 9/00–50
See application file for complete search history.

(56) References Cited

U.S. PATENT DOCUMENTS

2008/0052091 A1* 2/2008 Vawter ................ G06Q 50/265
705/325
2014/0075513 A1* 3/2014 Trammel ................ G06F 21/41
726/4
(Continued)

FOREIGN PATENT DOCUMENTS

CN    104899529 A    9/2015
CN    105324783 A    2/2016
(Continued)

OTHER PUBLICATIONS

PCT/US2021/036867, "International Search Report and Written Opinion", Sep. 30, 2021, 10 pages.
(Continued)

*Primary Examiner* — Ari Shahabi
(74) *Attorney, Agent, or Firm* — Kilpatrick Townsend & Stockton LLP

(57) ABSTRACT

A method includes a data processing computer receiving an authorization request message comprising a user device identifier, addition method data, and an amount for an interaction from a network processing computer. The network processing puter determined the user device identifier from a token associated with a first interaction type of a plurality of interaction types associated with a plurality of tokens. The data processing computer can then determine whether or not the user device identifier matches a stored user device identifier. If the user device identifier matches the stored user device identifier. then the data processing computer can further process the interaction using the user device identifier and the addition method data.

20 Claims, 10 Drawing Sheets

(51) Int. Cl.
  *G06Q 20/36*     (2012.01)
  *G06Q 20/38*     (2012.01)

(56)     References Cited

U.S. PATENT DOCUMENTS

2014/0344153 A1*  11/2014  Raj .................... G06Q 20/385
                                                    705/44
2020/0074434 A1*  3/2020   Chen ................... G06Q 20/24

FOREIGN PATENT DOCUMENTS

| CN | 106355404 A  | 1/2017  |
| CN | 109214815 A  | 1/2019  |
| CN | 110612701 A  | 12/2019 |
| KR | 20160107778 A| 9/2016  |
| KR | 20190082046 A| 7/2019  |
| WO | 2013086487 A1| 6/2013  |

OTHER PUBLICATIONS

Application No. CN202180020924.6 , Office Action, Mailed On Sep. 6, 2025, 24 pages with translation.
Application No. SG11202252083E , Written Opinion, Mailed On Sep. 6, 2025, 10 pages.

* cited by examiner

MULTIFUNCTIONAL USER DEVICE

CROSS-REFERENCES TO RELATED APPLICATIONS

This application is a U.S. National Stage of PCT Application No. PCT/US2021/036867, filed on Jun. 10, 2021, which claims priority to U.S. Provisional Application 63/038,629, filed on Jun. 12, 2020, which are incorporated herein by reference in their entirety.

BACKGROUND

Users can interact with resource providers to obtain or gain access to resources. For example, a user can utilize a user device to provide credentials to a resource provider in an interaction. The resource provider then provides the credentials and other data relating to the interaction to an interaction processing network that processes the interaction. The interaction processing network then processes the interaction based on the type of user device that was used in the interaction. For example, a user device in the form of a credit card is used to conduct a credit interaction, as opposed to a debit interaction.

In an exemplary digital interaction, a smartphone can store virtual user device such as a virtual access card. The virtual access card on the smartphone can provide a token representing a credential of the user device to a resource provider during an interaction. The resource provider provides the token and other data relating to the interaction (e.g., an interaction amount) to an interaction processing network that processes the interaction. The interaction processing network then processes the interaction based on the type of user device that was used to conduct the interaction.

However, these methods of processing interactions only allow for a user device (or digital representations thereof) to perform a single type of interaction. For example, a virtual or real credit card can only be used to perform credit transactions, a virtual or real access card may only be used to access one type of location, etc. Such conventional devices are relatively inflexible and require a user to have multiple user devices to conduct the different interaction types. This can be inconvenient and cumbersome.

Embodiments of the disclosure address this problem and other problems individually and collectively.

SUMMARY

One embodiment is related to a method comprising: receiving, by a data processing computer from a network processing computer, an authorization request message comprising a user device identifier, addition method data, and an amount for an interaction, wherein the network processing computer determined the user device identifier from a token associated with a first interaction type of a plurality of interaction types associated with a plurality of tokens; determining, by the data processing computer, whether or not the user device identifier matches a stored user device identifier; and if the user device identifier matches the stored user device identifier, further processing, by the data processing computer, the interaction using the user device identifier and the addition method data.

Another embodiment is related to a data processing computer comprising: a processor; and a computer-readable medium coupled to the processor, the computer-readable medium comprising code executable by the processor for implementing a method comprising: receiving, from a network processing computer, an authorization request message comprising a user device identifier, addition method data, and an amount for an interaction, wherein the network processing computer determined the user device identifier from a token associated with a first interaction type of a plurality of interaction types associated with a plurality of tokens; determining whether or not the user device identifier matches a stored user device identifier; and if the user device identifier matches the stored user device identifier, further processing the interaction using the user device identifier and the addition method data.

Another embodiment is related to a method comprising: receiving, by a service provider application on a communication device, a selection of a user device identifier to conduct an interaction from a user; presenting, by the service provider application, options for the user of the communication device to select an interaction type from a plurality of interaction types; receiving, by the service provider application, a selected interaction type from the user; presenting, by the service provider application, a plurality of addition methods associated with the selected interaction type, the plurality of addition methods associated with a data processing computer; receiving, by the service provider application, a selected addition method associated with the interaction type; and processing the selected interaction type using the selected addition method and a token associated with the interaction type.

Further details regarding embodiments of the disclosure can be found in the Detailed Description and the Figures.

DETAILED DESCRIPTION

Figure 1:
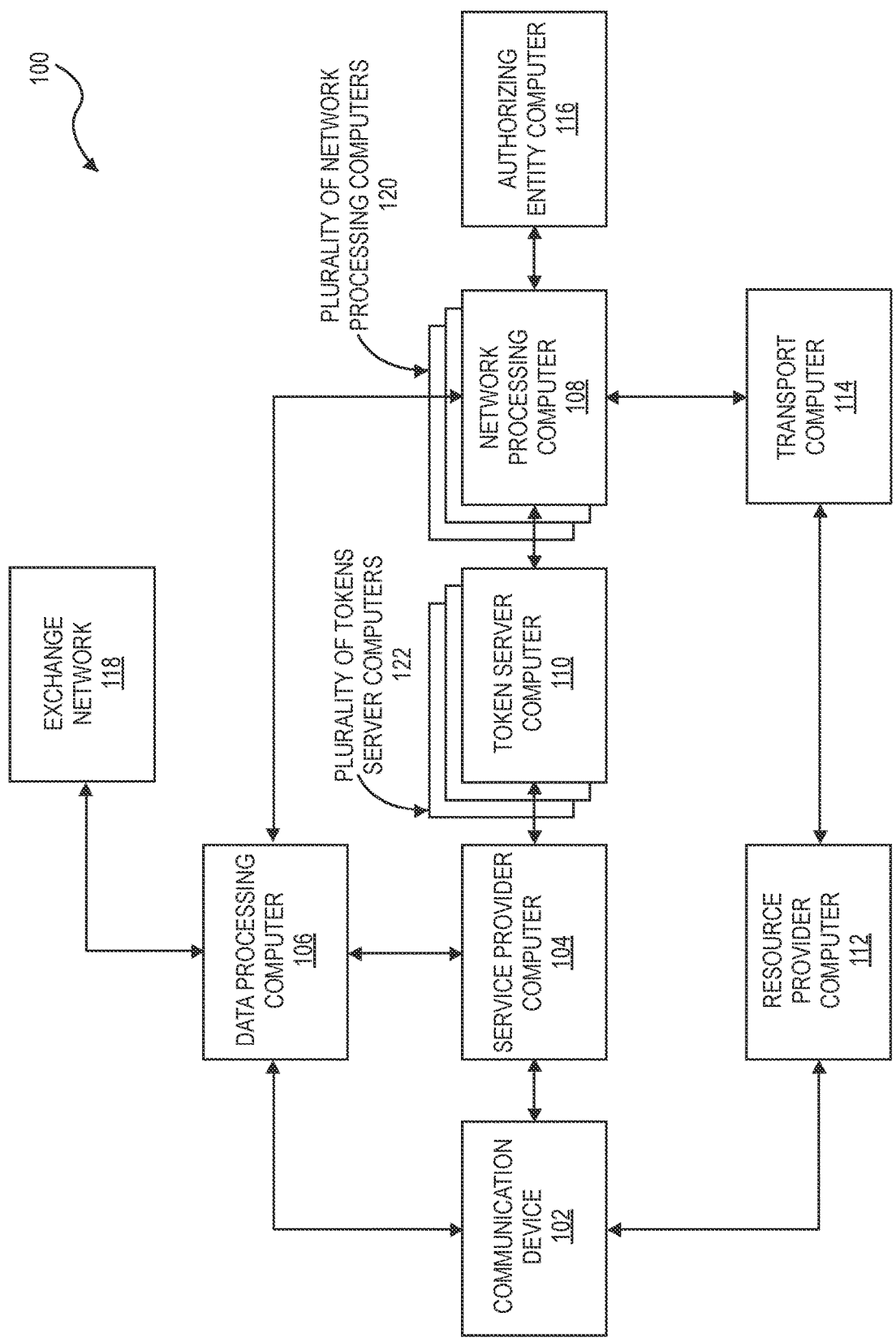
FIG. 1 shows a block diagram of a system according to embodiments.

Prior to discussing embodiments of the disclosure, some terms can be described in further detail.

A "user" may include an individual. In some embodiments, a user may be associated with one or more personal accounts and/or mobile devices. The user may also be a cardholder, account holder, employee, contractor, or consumer in some embodiments.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g., 3G, 4G or similar networks), Wi-Fi, Wi-Max, Bluetooth, Bluetooth low energy (BLE), or any other communication medium that may provide access to a network such as the Internet or a private network. Examples of mobile communication devices include mobile phones (e.g. cellular phones), personal digital assistants (PDAs), tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "user device" may include a device operated by a user. A user device can be used to conduct an interaction. For example, a user device can be used to provide credentials to a resource provider. The user device may be a software object, a hardware object, or a physical object. As examples of physical objects, the user device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A user device may be associated with a value such as a monetary value, a discount, or store credit, and a user device may be associated with an entity such as a bank, a merchant, a payment processing network, or a user. Suitable user devices can be hand-held and compact so that they can fit into a user's wallet and/or pocket (e.g., pocket-sized). Example user devices may include smart cards, magnetic stripe cards, keychain devices (such as the Speedpass™ commercially available from Exxon-Mobil Corp.), etc. Other examples of user devices include payment cards, smart media, transponders, and the like. If the user device is in the form of a debit, credit, or smartcard, the user device may also optionally have features such as magnetic stripes. Such devices can operate in either a contact or contactless mode.

A "user device identifier" can be a data item that identifies a user device. A user device identifier can be a interaction card number (e.g., a payment card number). For example, a user device identifier can be a 16 digit number (e.g., a PAN or primary account number). A user device identifier can be assigned to a user device by an issuer of the user device.

A "digital wallet" can include an electronic application or device that allows an individual to conduct electronic commerce transactions. A digital wallet may store user profile information, payment credentials, bank account information, one or more digital wallet identifiers, and/or the like, and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites or systems, transferring funds between users, and/or the like. A digital wallet can store digital versions of user devices. A digital wallet may be designed to streamline the purchase and payment process. A digital wallet may allow the user to load one or more payment cards onto the digital wallet so as to make a payment without having to enter an account number or present a physical card during an interaction. A digital wallet may also store interaction records (e.g., electronic receipts).

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data Transaction data can comprise a plurality of data elements with data values. Transaction data may include account information, an amount, an item identifier, a date, a time, device identifiers, and/or any other suitable type of data that can be used to access a resource such as data, goods, services, etc. Interaction data may be specifically associated with a user or a set of users, and may be in any suitable form.

An "interaction type" can include a category of interactions having common characteristics. Each interaction can have an interaction type. An interaction type can indicate how an interaction will be processed. An interaction type can be selected by a user when initiating an interaction. Examples of specific interaction types include a demand account interaction, a credit account interaction, a specific location access interaction, etc.

An "account" can include a record of amounts utilized in interactions. An account can include an arrangement by which a body holds funds on behalf of a client or supplies goods or services to the client on credit. An account can be maintained by a computer on behalf of a user. For example, a data processing computer can maintain an account (e.g., a user account) on behalf of a user. An account can be utilized during an interaction.

"Account information" may include any information associated with a user's account. Such information may be directly related to the account or may be derived from information related to the account. Examples of account information may include an account identifier, a username, a password, user information (e.g., name, age, email address, shipping address, etc.). In some cases, account information may also be known as payment account information, card account information, or the like, and may be associated with a user device (e.g., payment card). For example, account information may include a PAN (Primary Account Number or "account number"), user name, expiration date, CVV (Card Verification Value), dCVV (Dynamic Card Verification Value), CVV2 (Card Verification Value 2), CVC3 (Card Verification Code 3) card verification values, etc. CVV2 is generally understood to be a static verification value associated with a user device. CVV2 values are generally visible to a user (e.g., a user), whereas CVV and dCVV values are typically embedded in memory or authorization request messages and are not readily known to the user (although they are known to the issuer and payment processors).

An "addition method" can include a particular procedure for adding something to something else. In some embodiments, an "addition method" may be referred to as a "funding method." For example, an addition method can include a method of adding an amount to an amount stored in an account and/or a method for paying for an interaction such as a transaction. An addition method can also correspond to an interaction type. In some embodiments, a particular addition method may be utilized with one interaction type, but not with another interaction type. For example, an example of an addition method may be an installments payment plan that will be used to fund a payment transaction. The installments payment plan would be associated with an interaction type such as a credit interaction. The installments payment plan would not be appropriate for an interaction type such as a debit interaction. In some embodiments, a debit interaction type (e.g., using a debit card account) can use an addition method such as a bank partner token. The bank partner token may represent a debit account number and may be used to process the payment. In some embodiments, a platform credential (e.g., a credential associated with a data processing computer) can use addition methods such as a balance transfer from an account held at a data processing computer, an automated clearing house (ACH) transaction with an external financial institution, a real-time payment (RTP) transaction with an external financial institution, and a points or rewards redemption account associated with the data processing computer or with an external entity. In some embodiments, a credit interaction type (e.g., using a credit card account) can use addition methods such as an installments payments plan using a charge card account, a pay at the end of the month payment plan using a charge card account, and a revolving balance payment plan using a charge card account. In some embodiments, the credit interaction type may include addition methods that may involve instant payback. Such addition methods may include a no balance funding method and/or a transaction financing funding method.

"Addition method data" can include information relating to an addition method. An addition method can be identified by addition method data. Addition method data can indicate to a computer which addition method is to be utilized during an interaction.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g., a payment account and/or user device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, tokens, personal identification tokens, etc. Token may include an identifier for an account that is a substitute for an account identifier, such as a primary account number (PAN). For example, an token may include a series of alphanumeric characters that may be used as a substitute for an original account identifier. For example, a token "4900 0000 0000 0001" may be used in place of a PAN "4147 0900 0000 1234." In some embodiments, an token may be "format preserving" and may have a numeric format that conforms to the account identifiers used in existing transaction processing networks (e.g., ISO 8583 financial transaction message format). In some embodiments, an token may be used in place of a PAN to initiate, authorize, settle or resolve a payment transaction or represent the original credential in other systems where the original credential would typically be provided. In some embodiments, a token may be generated such that the recovery of the original PAN or other account identifier from the token value may not be computationally derived. Further, in some embodiments, the token format may be configured to allow the entity receiving the token to identify it as a token and recognize the entity that issued the token.

A "resource provider" may be an entity that can provide a resource such as goods, services, information, and/or access. Examples of resource providers includes merchants, data providers, transit agencies, governmental entities, venue and dwelling operators, etc.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), entry and/or exit gates for transit systems, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device and/or mobile device. In some embodiments, a cellular phone, tablet, or other dedicated wireless device used as a POS terminal may be referred to as a mobile point of sale or an "mPOS" terminal. In some embodiments, one or more access devices may be associated with a resource provider computer.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be referred to as a "transport computer."

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a user device or payment account. The authorization request message may include an issuer account identifier that may be associated with a user device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

An "exchange network" can include one or more computers that can facilitate an exchange between parties. An exchange network can include one or more routing computers that can route messages between the computers of the exchange network. In some embodiments, the exchange network can include an automated clearing house network, a blockchain network, a rewards network etc. External entities such as financial institutions and their computers may be connected to the exchange network.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers. A server computer may also be a cloud server computer.

FIG. 1 shows a system 100 according to embodiments of the disclosure. The system 100 comprises a communication device 102, a service provider computer 104, a data processing computer 106, a network processing computer 108, a token server computer 110, a resource provider computer 112, a transport computer 114, an authorizing entity computer 116, and an exchange network 118. In some embodiments, the network processing computer 108 can be one network processing computer of a plurality of network processing computers 120. In some embodiments, the token server computer 110 can be one token server computer of a plurality of token server computers 122.

The communication device 102 can be in operative communication with the service provider computer 104, the data processing computer 106, and the resource provider computer 112. The service provider computer 104 can be in operative communication with the data processing computer 106 and the token server computer 110. The token server computer 110 can be in operative communication with the network processing computer 108. The network processing computer 108 can be in operative communication with the data processing computer 106, the transport computer 114, and the authorizing entity computer 116. The transport computer 114 can be in operative communication with the resource provider computer 112. The exchange network 118 can be in operative communication with the data processing computer 106.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices of system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The communication device 102 can include a mobile device operated by a user. In some embodiments, the communication device 102 can store a service provider application associated with the service provider computer 104. In some embodiments, the service provider application can be a digital wallet application, and the service provider computer 104 can be an application server computer that services the digital wallet application. The communication device 102 can also store an application associated with the data processing computer 106. In some embodiments, the application associated with the data processing computer 106 can be a second digital wallet application.

The service provider computer 104 can include a computer operated by an entity that maintains a service provider application on the communication device 102. A service provider or an application provider may be an entity that can provide a service or application. An example of a service provider is a digital wallet provider. In some embodiments, the service provider computer 104 may be a first digital wallet server computer, and the data processing computer 106 may be a second digital wallet server, where both digital wallet servers may have access to accounts maintained by the server on behalf of the user.

The data processing computer 106 can include a computer that can maintain another application (different than the service provider application) on the communication device 102. The data processing computer 106 can maintain a user account associated with the user, and that user account may be tied to one or more addition methods. In some embodiments, the data processing computer 106 can authorize an interaction initiated by the user on the communication device 102 using the service provider application associated with the service provider computer 104. In other embodiments, the data processing computer 106 can request authorization for an interaction from the authorizing entity computer 116. In yet other embodiments, the data processing computer 106 can request authorization for an interaction from the exchange network 118.

The network processing computer 108 may include data processing subsystems, networks, and operations used to support and deliver authorization services, exception file services, and clearing and settlement services. An exemplary network processing computer may include VisaNet®. Network processing computers such as VisaNet® are able to process credit card transactions, debit card transactions, and other types of commercial transactions. VisaNet®, in particular, includes a VIP system (Visa Integrated Payments system) which processes authorization requests and a Base II system which performs clearing and settlement services.

The token server computer 110 can be configured to maintain and provision tokens. The token server computer 110 can be associated with a database (e.g., a token database) that stores user device identifiers in association with access credentials. In some embodiments, a user device identifier can correspond to, and be associated with, one or more tokens. The token server computer 110 can perform tokenization and detokenization methods.

The resource provider computer 112 may be a computer operated by a resource provider. The resource provider computer 112 may include one or more access devices, back end server computers, etc. The resource provider computer 112 may be configured to generate and transmit authorization request messages for transactions (e.g., payment transactions).

The transport computer 114 can be a computer that receives and forwards authorization request and response messages, and that participates in clearing and settlement processes. In one embodiment, the transport computer 114 may be a computer operated by an acquiring entity.

The authorizing entity computer 116 can be a computer operated by an authorizing entity. In various embodiments, the network processing computer 108 may determine, based on the data in the authorization request message, an authorizing entity computer 116 associated with user for the transaction. For example, the network processing computer 108 can read an account identifier and may determine that the first six digits of the account identifier comprises an issuer identification number (IIN) specifying an authorizing system associated with user or user's credentials. In some embodiments, the authorizing entity computer 116 may be a computer of an issuing entity that issues credentials and/or user devices to the user such as a bank, government agency, security network, etc. Upon determination of the authorizing entity computer 116, the network processing computer 108 may determine an address of authorizing entity computer 116, so that the authorization request message can be routed to authorizing entity computer 116 for authorization of the transaction.

The exchange network 118 can include a plurality of computers that perform operations to process an interaction in the exchange network 118. The exchange network 118 can include one or more routing computers (e.g., operator computers). The routing computers can receive requests (e.g., exchange request messages) and route the requests to the relevant computer involved in the request. For example, the data processing computer 106 can generate and provide an exchange request message to the exchange network 118. A routing computer in the exchange network 118 can receive the exchange request message and forward the exchange request message to the appropriate computer for authorization, and can receive a response thereto.

In some embodiments, the exchange network 118 can be a network of computers and routing computers that can perform ACH transfers between accounts maintained by the computers operating in the exchange network 118. In other embodiments, the exchange network 118 can be a blockchain network that includes a plurality of nodes. The blockchain network can receive exchange request messages for interaction from the data processing computer 106. The nodes of the blockchain network can determine whether or not to include data representing the interaction of the exchange request message into a block of the blockchain. In yet other embodiments, the exchange network 118 can be a rewards network that includes a plurality of accounts that can include rewards points. The rewards points can be transferred between rewards points accounts in the rewards network.

Figure 2:
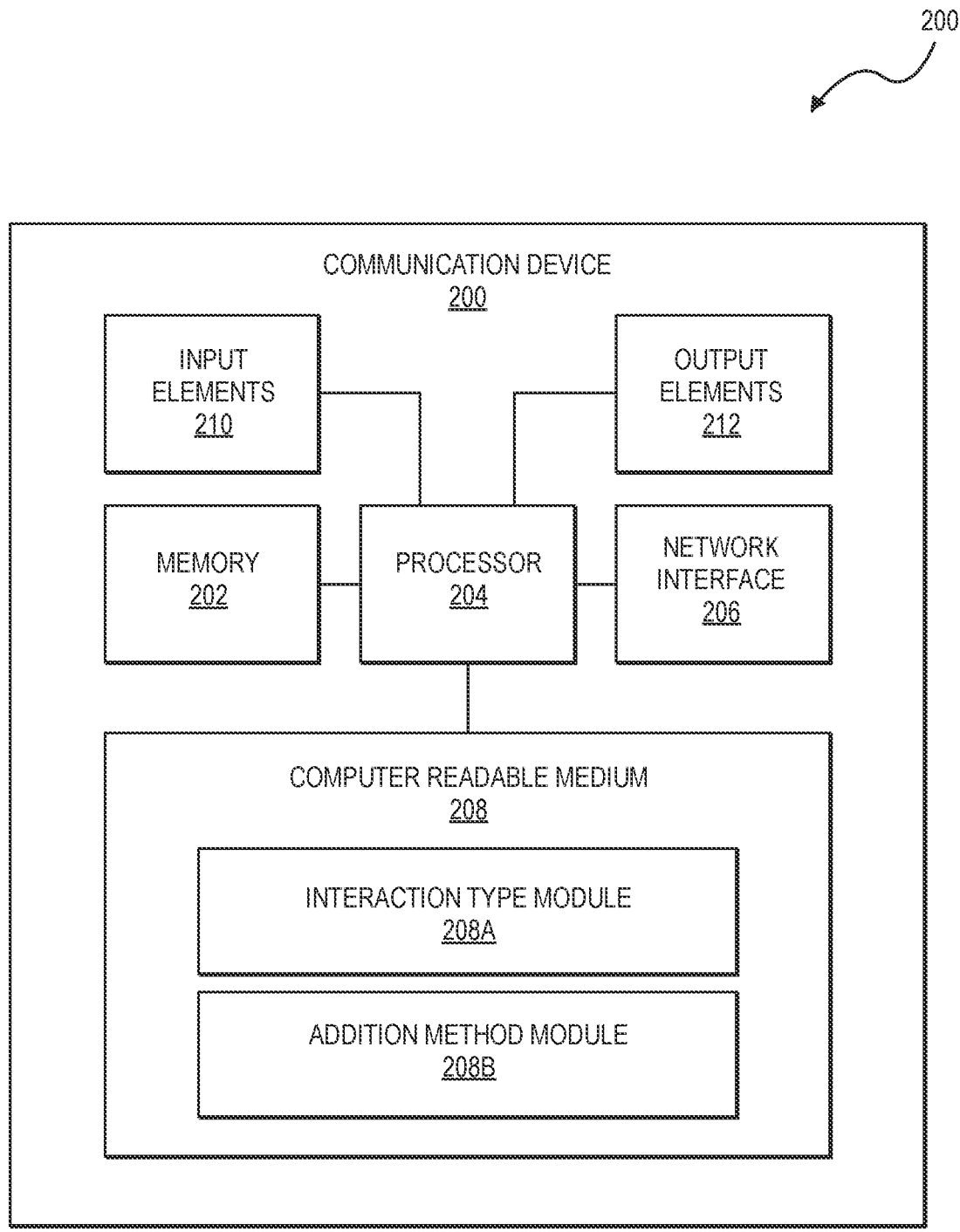
FIG. 2 shows a block diagram of components of a communication device according to embodiments.

FIG. 2 shows a block diagram of a communication device 200 according to embodiments. The exemplary communication device 200 may comprise a processor 204. The processor 204 may be coupled to a memory 202, a network interface 206, input elements 210, output elements 212, and a computer readable medium 208. The computer readable medium 208 can comprise a number of modules including an interaction type module 208A and an addition method module 208B.

The memory 202 can be used to store data and code. The memory 202 may be coupled to the processor 204 and may comprise any combination of volatile and/or non-volatile memory (e.g., RAM, DRAM, ROM, flash, etc.). In some embodiments, the memory 202 can store one or more tokens, one or more interaction types, one or more addition methods, etc.

The one or more input elements 210 may include any suitable device(s) capable of inputting data into the communication device 200. Examples of input elements 210 include buttons, touchscreens, touch pads, microphones, etc.

The one or more output elements 212 may comprise any suitable device(s) that may output data. Examples of output elements 212 may include display screens, speakers, and data transmission devices.

The non-transitory computer readable medium 208 may comprise code, executable by the processor 204, for performing a method comprising: receiving, by a service provider application on a communication device, a selection of a user device identifier to conduct an interaction from a user; presenting, by the service provider application, options for the user of the communication device to select an interaction type from a plurality of interaction types; receiving, by the service provider application, a selected interaction type from the user; presenting, by the service provider application, a plurality of addition methods associated with the selected interaction type, the plurality of addition methods associated with a data processing computer; receiving, by the service provider application, a selected addition method associated with the interaction type; and processing the selected interaction type using the selected addition method and a token associated with the interaction type.

The interaction type module 208A can comprise code or software executable by the processor 204, for determining interaction types and receiving user selected interaction types. The interaction type module 208A, in conjunction with the processor 204, can determine one or more interaction types available to the user of the communication device 200 based on a selected user device identifier (e.g., selected by the user). The interaction type module 208A, in conjunction with the processor 204, can obtain logic or data associated with one or more interaction types that are associated with the selected user device identifier from memory. The one or more interaction types can be previously received from a service provider computer during token provisioning. Each interaction type can correspond to a token of a plurality of tokens for the selected user device identifier.

Upon receiving the user's selection of an interaction type, the interaction type module 208A, in conjunction with the processor 204, can obtain the token corresponding to the selected interaction type from memory. For example, if the user selects "credit" as the interaction type, then a payment token for a credit transaction can be obtained from memory. The memory may contain different tokens for different transaction types.

The interaction type module 208A, in conjunction with the processor 204, can provide the selected interaction type as input to the addition method module 208B.

The addition method module 208B can comprise code or software executable by the processor 204, for determining addition methods and receiving user selected addition methods. The addition method module 208B, in conjunction with the processor 204, can determine one or more addition methods that correspond to the selected interaction type, as received from the interaction type module 208A. The addition method module 208B, in conjunction with the processor 204, can prompt the user to selected an addition method of the one or more available addition methods.

The network interface 206 may include an interface that can allow the communication device 200 to communicate with external computers. The network interface 206 may enable the communication device 200 to communicate data to and from another device (e.g., a service provider computer, a resource provider computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™.

Embodiments can use the systems and apparatuses described herein to at least provision a plurality of tokens associated with a user device identifier to a communication device. The communication device can present the user with requests for selection of various options related to the user device identifier and plurality of tokens. FIGS. 3-9B describe some examples of such methods.

Figure 3:
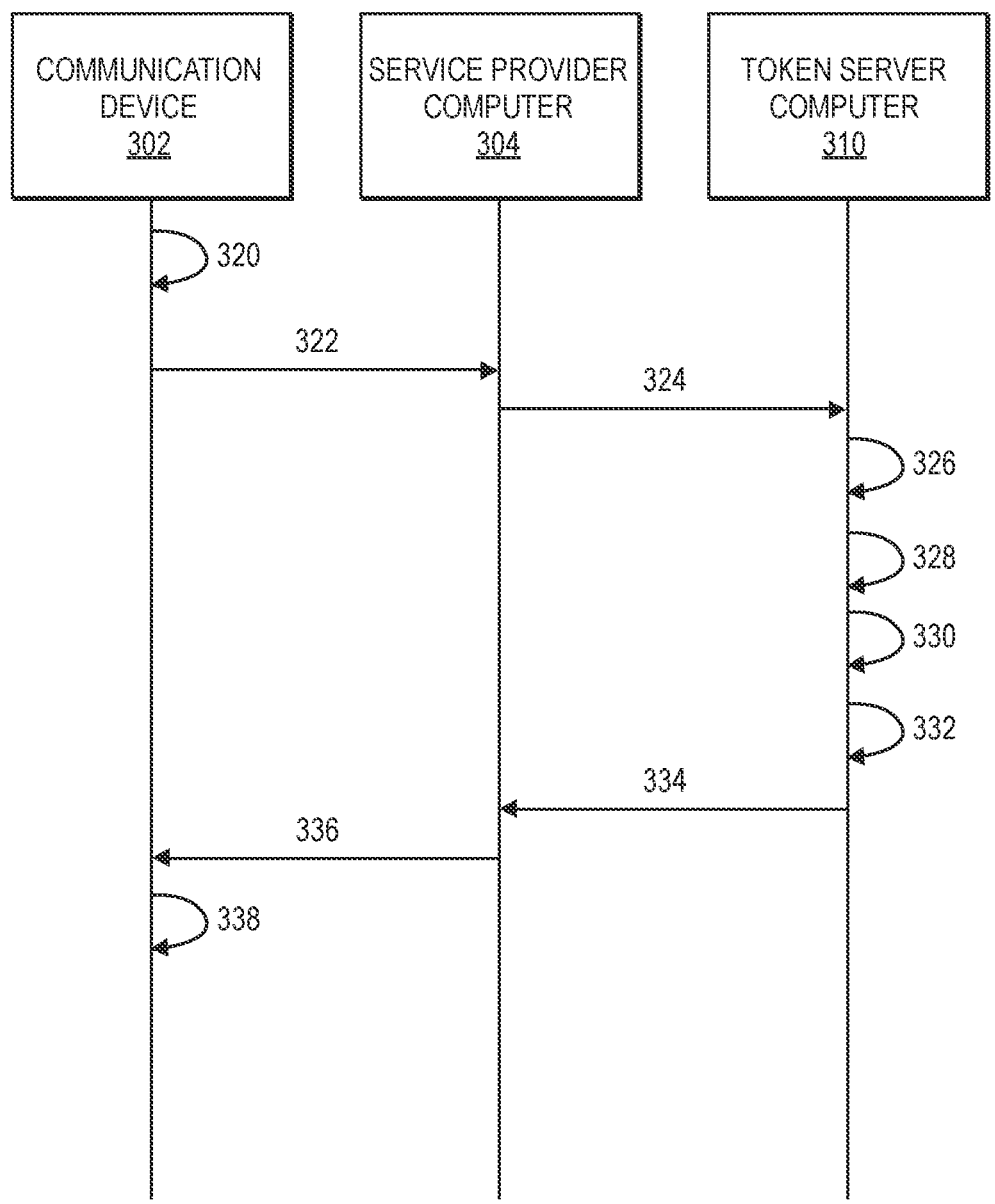
FIG. 3 shows a flowchart illustrating a token provisioning method according to embodiments.

FIG. 3 shows a flowchart illustrating an token provisioning method according to embodiments. The method illustrated in FIG. 3 will be described in the context of a user adding, for example, a user device or portable device (e.g., payment card) that is capable of functioning as a credit card and a debit card to a service provider application on a communication device 302. It is understood, however, that the invention can be applied to other circumstances.

Prior to step 320, a service provider application on the communication device 302 can present the user with a data entry screen that can allow the user to input user device data. For example, the user can input a user device identifier (e.g., a payment card number). The user can input other details related to the user device including, for example, an expiration date, a code (e.g., a CVV), a name, and/or any other suitable information printed or displayed on the user device. The user can select an "add" button that can allow the user to add the user device to the service provider application (e.g., a wallet application). The communication device 302 can display a screen illustrating the user device that can include the details of the user device (e.g., a user device identifier, expiration data, a code, a user name, etc.) to the user after the user inputs details related to the user device.

In some embodiments, after the user selects a button to add the user device to the service provider application, the service provider application of the communication device 302 can initiate a user authentication method. For example, the service provider application of the communication device 302 can initiate the sending of a verification code (e.g., a one-time password) to a device operated by the user, the user's email address, the user's phone number, etc. The service provider application can request a service provider computer 304 to provide generate and/or provide the one-time password to the to the device operated by the user, the user's email address, the user's phone number, etc. The service provider application on the communication device 302 can then prompt the user to input the verification code (e.g., 12345).

At step 320, the communication device 302 can generate a token request message. In some embodiments, a service provider application on the communication device 302 can initiate the request for the plurality of tokens. The token request message can request one or more tokens that are associated with a user device identifier. The token request message includes the user device identifier. The user device identifier can be associated with one or more interaction types. As an example, the user device identifier can be a payment card number associated with a portable device that is a payment card that can be used in both credit transactions and debit transactions.

At step 322, after generating the token request message, the communication device 302 can provide the token request message to a service provider computer 304.

At step 324, after receiving the token request message, the service provider computer 304 can provide the token request message to the token server computer 310.

At step 326, after receiving the token request message, the token server computer 310 can obtain one or more tokens that are associated with the received user device identifier. For example, in some embodiments, the token server computer 310 can generate the one or more tokens if the one or more tokens have not yet been generated. In other embodiments, the token server computer 310 can retrieve previously generated tokens that are already associated with the user device identifier. In yet other embodiments, the token server computer 310 can obtain pre-generated tokens and assign the pre-generated tokens as the one or more tokens associated with the received user device identifier. Each token of the one or more tokens is associated with the device identifier and respectively adapted for use in different types of interactions. In some embodiments, the different types of interactions include demand account interactions and credit account interactions.

The token server computer 310 can validate the user device identifier received in the token request message. For example, the token server computer 310 can verify the user device identifier with an internal or external database to determine if the user device identifier is on a white list or a black list.

At step 328, the token server computer 310 can associate available interaction types for each token of the one or more tokens.

At step 330, after assigning the interaction types, the token server computer 310 can associate available addition methods for each interaction type.

At step 332, the token server computer 310 can generate a token response message comprising the one or more tokens and, in some embodiments, the user device identifier. The token response message can also include data relating to the interaction types associated with each token of the one or more tokens. The token response message may also comprise data relating to the addition methods associated with each interaction type.

At step 334, after generating the token response message, the token server computer 310 can provide the token response message to the service provider computer 304.

At step 336, after receiving the token response message, the service provider computer 304 can provide the token response message to the communication device 302.

At step 338, after receiving the token response message, the communication device 302 can store the one or more tokens (e.g., two or more) from the token response message in a memory of the communication device 302. The one or more tokens are stored in association with the corresponding interaction type and addition methods that correspond to the interaction type.

In some embodiments, the service provider application on the communication device 302 can load a GUI that represents the user device and the associated tokens. For example, the GUI may display the user device identifier, or a portion of the user device identifier (e.g., the last four digits) and any other data relating to the user device.

Figure 4:
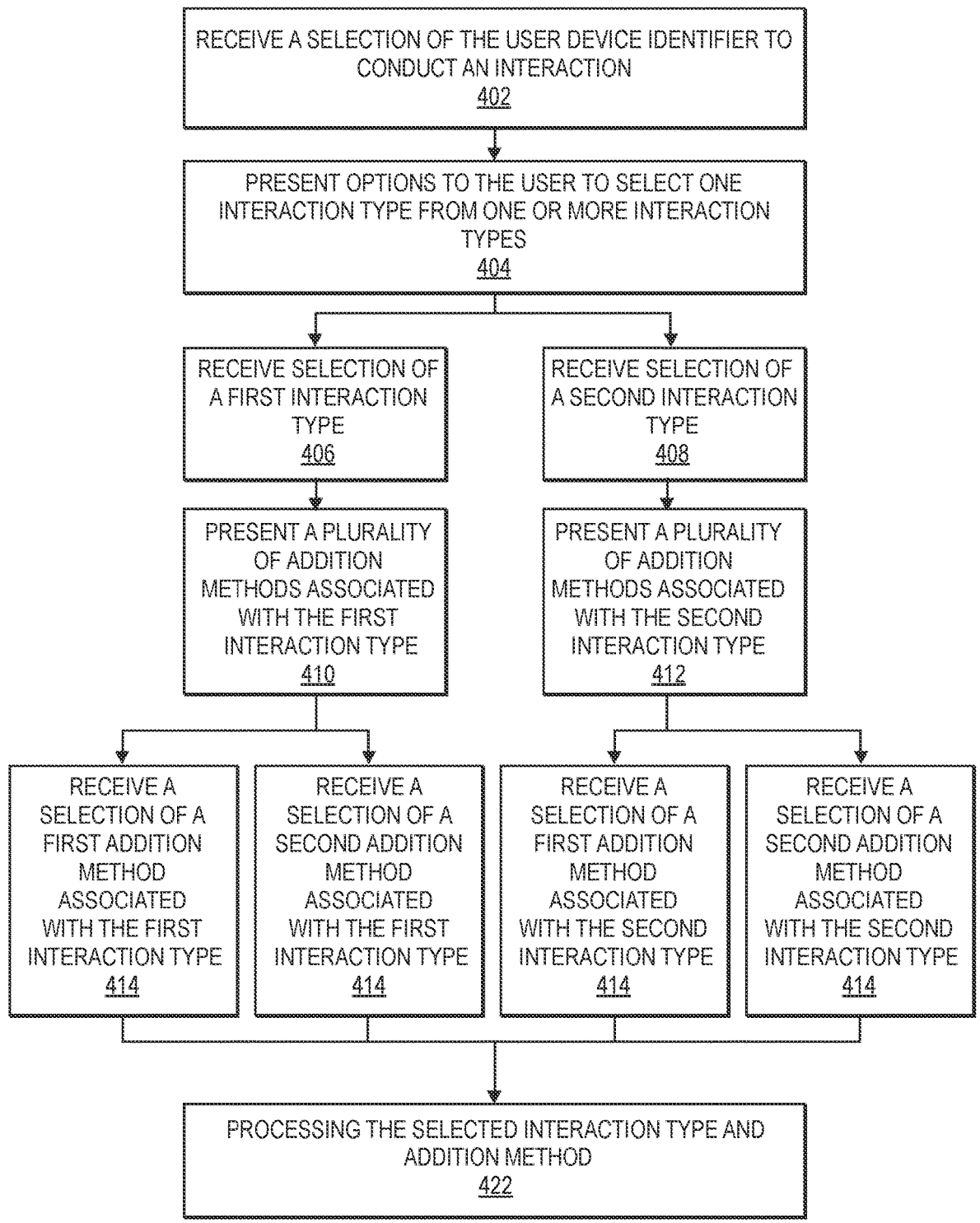
FIG. 4 shows a flowchart illustrating user selection of a token according to embodiments.

FIG. 4 shows a flowchart illustrating user selection of a token according to embodiments. The method illustrated in FIG. 4 will be described in the context of a user selecting a user device identifier, an interaction type, and an addition method when initiating an interaction. It is understood, however, that the invention can be applied to other circumstances. The method of FIG. 4 can be performed by a communication device. In particular, the method of FIG. 4 can be performed by a service provider application (e.g., a wallet application) on the communication device.

At step 402, the communication device can receive a selection of a user device identifier to conduct an interaction from a user via one or more input elements on the communication device. For example, the user can select a particular user device identifier that is presented by a service provider application on the screen of the communication device. The user device identifier may be previously provided to the service provider application, for example, as described in reference to FIG. 3. The user device identifier may be a primary account number of a payment card that is capable of conducting credit and/or debit interactions.

At step 404, the communication device can present options for the user to select from. The selection may include an interaction type from two or more different types of interactions that are associated with the selected user device identifier. For example, the communication device can allow the user to select from a first type of transaction (e.g., debit) or a second type of transaction (e.g., credit) to conduct the transaction. The communication device can present the available interaction types that were received in step 338 from the service provider computer, as illustrated in FIG. 3.

At steps 406 and 408, the communication device can receive a selection of an interaction type from the user. For example, the communication device can receive a selection of a first interaction type at step 406. Alternatively, the communication device can receive a selection of a second interaction type at step 408. As an example, the first interaction type can be a demand account interaction and the second interaction type can be a credit account interaction.

At steps 410 and 412, the communication device can present a plurality of addition methods that are associated with the selected interaction type. For example, at step 410, the communication device can present the user with addition methods (e.g., ACH, debit card, etc.) that are associated with the first interaction type (e.g., cash type, debit type, etc.). At step 412, the communication device can present the user with addition methods (e.g., bill at the end of the month, installment payments, etc.) associated with the second transaction type (e.g., credit type).

As an illustrative example, the first interaction type can be a demand account transaction. The demand account transaction type can correspond to addition methods including the use of 1) a debit credential (e.g., using a second token associated with a user account maintained by a third party such as an authorizing entity computer to process a transaction) or 2) a platform credential (e.g., using a balance transfer, an automated clearing house (ACH), a real-time payment (RTP), a points or rewards redemption, etc.). The second interaction type can be a credit account transaction. The credit account transaction type can correspond to addition methods using 1) a charge card (e.g., using an installments plan, at the end of the month, using a revolving balance, etc.) or 2) an instant payback (e.g., using a no balance card, transaction financing, etc.).

At steps 414, 416, 418, and 420, after presenting the addition methods to the user, the communication device can receive a selection of an addition method associated with the selected interaction type. For example, at step 414, the communication device can receive a selection of a first addition method (e.g., ACH/RTP) associated with the first interaction type (e.g., demand account transaction). At step 416, the communication device can receive a selection of a second addition method (e.g., rewards points) associated with the first interaction type (e.g., demand account transaction). At step 418, the communication device can receive a selection of a first addition method (e.g., installments) associated with the second interaction type (e.g., credit account transaction). At step 420, the communication device can receive a selection of a second addition method (e.g., credit line) associated with the second interaction type (e.g., credit account transaction).

As noted above, tokens corresponding to different interaction types are stored on the communication device, and the user can initiate a transaction (e.g., a payment transaction) using one of the tokens. In some embodiments, the provisioned tokens can correspond to credit and debit AIDs (application identifiers). For example, a first token can correspond to a credit AID while a second token can correspond to a debit AID for the same user device identifier. A specific token and a specific AID may be used by the communication device, depending upon the interaction type and the addition method chosen by the user.

As an illustrative example, after receiving a selection of a type of transaction, the service provider application can present the plurality of addition methods associated with the selected type of transaction. For example, if the user selected a cash transaction (e.g., a demand account transaction), the service provider application presents the user with an additional query of which addition method to utilize during the selected type of transaction.

If the user selected a type of transaction of demand account transaction, then the service provider application can present the user with the addition method options of (1A) using a debit credential or (1B) using a platform credential. For example, the debit credential can include options of using a bank partner token (e.g., a token associated with an account maintained by an authorizing entity computer). The platform credential can include options of using a pre-existing balance, performing an ACH/RTP (automated clearing house/real-time payments) transaction, and using points/rewards. The selection of a demand account transaction can allow the communication device to utilize the debit AID during a transaction. The debit AID can trigger transactions posting to an underlying asset/checking account (e.g., a demand account).

If the user selected a type of transaction such as a credit account transaction, then the service provider application can present the user with the addition method options of (2A) using a charge card or (2B) performing instant payback. For example, the charge card can include options of using installments, end of month payments, and revolving balance payments, which may be identified by a token associated with an account maintained by an authorizing entity computer. The instant payback options include "no balance" and "transaction financing." In some embodiments, the presented addition methods for a credit account transaction can include 1) existing debit and 2) real-time-payment, decoupled debit (third party ACH), or wallet balance (e.g., posting to fund the debit AID triggered transaction).

The selection of a credit account transaction can allow the communication device to utilize the credit AID during a transaction. The credit AID can trigger transactions with a true extension of a credit posting to a credit BIN (bank identification number). In some embodiments, utilization of the credit AID during a transaction can allow for auto card balance payments at a particular (e.g., predetermined or selected) frequency (e.g., 14 days, 1 month, etc.).

In some embodiments, if the user selects a type of transaction such as a debit account transaction, then the user's account maintained by the data processing computer can be funded using a third party debit account (e.g., a debit card issued by an authorizing entity of an authorizing entity computer). For example, user's selected user device identifier and corresponding debit token can be used to provide an amount (e.g., funds) from the user's account maintained by the data processing computer to a resource provider account associated with the resource provider computer). Further, the account held by the data processing computer can then be funded with the selected third party debit account.

At step 422, after receiving the selection of the interaction type and the addition method of the interaction, the communication device can process the selected interaction type using the selected addition method and a token associated with the interaction type. For example, in some embodiments, the communication device can retrieve a token corresponding to the selected interaction type and addition method from memory, and then use it to process the interaction according to the selected interaction type and addition method.

As an illustrative example, the service provider application on the communication device can receive a selection of an addition method associated with the interaction type from the user. The service provider application can then proceed to process the interaction. In some embodiments, during the interaction, an AID corresponding to the selected interaction type can be provided from the communication device to the resource provider computer. For example, if the selected interaction type is a credit account transaction, then the communication device can transmit the credit AID to the resource provider computer. If the selected interaction type is a demand account transaction, then the communication device can transmit the debit AID to the resource provider computer. In some embodiments, the communication device can transmit the AID in response to a select AID command, or other suitable APDU (application protocol data unit) command, received from the resource provider computer, or an access device (e.g., a point of sale) in operative communication with the resource provider computer. The specific AID sent by the communication device can be used by the resource provider computer or an associated access device to process the interaction according to the interaction type. For example, if a resource provider computer receives an AID associated with a debit transaction, then the resource provider computer may request a PIN from the user in response to receiving the debit AID.

Figure 5:
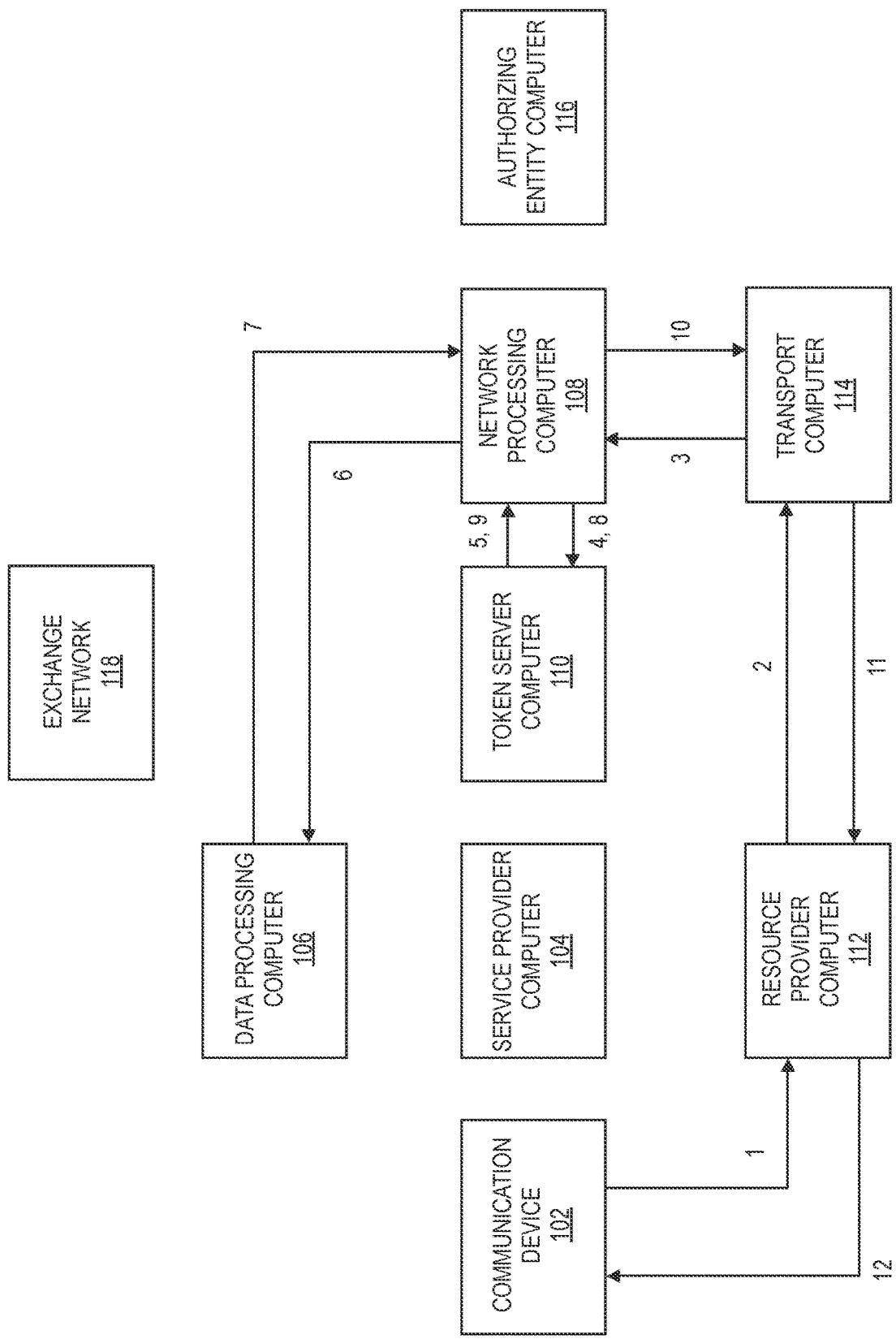
FIG. 5 shows a first interaction processing method according to embodiments.

FIG. 5 shows a first interaction processing method according to embodiments. The method illustrated in FIG. 5 will be described in the context of a user of a communication device performing a process using a particular interaction type and addition method. For example, the interaction type illustrated in FIG. 5 can be a demand account interaction. The addition method illustrated in FIG. 5 can be an addition method that uses an account maintained by a data processing computer during the interaction.

Prior to step 1, the user can select a user device identifier (e.g., which can represent a payment card) for use in an interaction. In some embodiments, the user can then select a type of transaction and an addition method as described in reference to FIG. 4. In other embodiments, the user may not specify the interaction type and/or the addition method. In such cases, the user device identifier can be associated with pre-established default option for the interaction type and the addition method.

After the user initiates the interaction via a first service provider application (e.g., associated with the service provider computer 104) on the communication device 102, the communication device 102 can obtain a token associated with the selected user device identifier, the selected interaction type, and the selected addition method data.

At step 1, the communication device 102 can provide token, the interaction type, and the addition method data to the resource provider computer 112. For example, the resource provider computer 112 can receive the token from the communication device 102 via NFC, a contact interface, etc. In some embodiments, the communication device 102 can further transmit an application identifier (AID) associated with the interaction type to the resource provider computer 112. For example, the provisioned token can correspond to a credit AID or a debit AID. For example, a first token can correspond to a credit AID while a second token can correspond to a debit AID. The communication device 102 can transmit the AID associated with the selected interaction type to the resource provider computer 112. Further, the communication device 102 can provide the addition method data, which can be in the form of a data flag, to the resource provider computer 112.

After receiving the token, the interaction type, and the addition method data, the resource provider computer 112 can generate an authorization request message comprising the token. In some embodiments, the authorization request message can include interaction data and an interaction amount (e.g., a transaction amount). The resource provider computer 112 can also include the addition method data into the authorization request message. In some embodiments, the resource provider computer 112 can further include the interaction type in the authorization request message. However, if the interaction type is not included in the authorization request message, then the token server computer 110 can later determine the interaction type based on the token.

At step 2, after generating the authorization request message, the resource provider computer 112 can transmit the authorization request message to the transport computer 114.

At step 3, after receiving the authorization request message, the transport computer 114 can transmit the authorization request message to the network processing computer 108.

At step 4, after receiving the authorization request message from the transport computer 114, the network processing computer 108 can provide the token to the token server computer 110 for detokenization (e.g., in a detokenization request message). For example, the network processing computer 108 can generate a detokenization request message that includes the token and then transmit the detokenization request message to the token server computer 110.

Upon receiving the token in the detokenization request message, the token server computer 110 can determine a user device identifier (e.g., 1234567890123456) and the interaction type (e.g., a flag that indicates that the user device identifier is being used in a credit or debit interaction) associated with the token (e.g., using a database).

At step 5, after obtaining the user device identifier, and in some cases the interaction type, the token server computer 110 can provide the user device identifier and, in some cases, the interaction type to the network processing computer 108 in a detokenization response message.

After receiving the user device identifier (e.g., 1234567890123456), the network processing computer 108 can modify the authorization request message to include the user device identifier in place of the token. If the interaction type was not included in the authorization request message by the resource provider computer 112, then the network processing computer 108 can insert the interaction type received from the token server computer 110 into the authorization request message.

At step 6, after modifying the authorization request message, the network processing computer 108 can provide the modified authorization request message to the data processing computer 106. At this point, the modified authorization request message can include the user device identifier, the interaction type, the addition method data, the amount, and interaction data.

After receiving the modified authorization request message, the data processing computer 106 can verify whether or not the received user device identifier corresponds to a stored user device identifier in a database. The data processing computer 106 can also determine the addition method data associated with the current interaction. For example, in some embodiments, the authorization request message provided from the resource provider computer 112 can include the addition method data. In some embodiments, if no addition method data is received, the data processing computer 106 can determine to utilize a default addition method data associated with the user device identifier.

For example, the addition method data can be an addition method data that indicates to utilize an account maintained by the data processing computer 106 during the interaction. As such, the data processing computer 106 can determine whether or not to authorize the interaction. The data processing computer 106 can determine if the account, which is a user account associated with the user of the communication device 102, maintained by the data processing computer 106 includes an amount that exceeds or is equal to the amount in the authorization request message.

If the stored amount exceeds the amount, then the data processing computer 106 can authorize the interaction. In some embodiments, the data processing computer 106 can determine whether or not to authorize the interaction based on any number of features including, but not limited to, communication device identifiers, account amounts, interaction frequency, interaction type, addition method, etc.

After deciding to authorize the interaction, the data processing computer 106 can apply the amount to the user account. For example, applying the amount to the user account can include deducting the amount indicated in the authorization request message from the stored amount included in the user account.

The data processing computer 106 can then generate an indication of whether or not the interaction is authorized, and can generate an authorization response message including the indication. The authorization request message can also include other information such as the user device identifier, the interaction type, and, in some embodiments, the addition method data.

At step 7, after determining whether or not to authorize the interaction, the data processing computer 106 can provide the authorization response message to the network processing computer 108 in response to receiving the authorization request message.

At step 8, after receiving the authorization response message, the network processing computer 108 can provide the user device identifier and interaction type to the token server computer 110 for tokenization (e.g., in a tokenization request message).

The token server computer 110 can determine the token associated with the received user device identifier. The token server computer 110 can also determine the token based on the interaction type.

At step 9, after obtaining the token, the token server computer 110 can provide the token to the network processing computer 108.

After receiving the token from the token server computer 110, the network processing computer 108 can modify the authorization response message to include the token in place of the user device identifier.

At step 10, after replacing the user device identifier with the token, the network processing computer 108 can then provide the modified authorization response message to the transport computer 114.

The transport computer 114 can receive the modified authorization response message from the network processing computer 108 and then, at step 11, can provide the modified authorization response message to the resource provider computer 112.

At step 12, the resource provider computer 112 can then optionally provide (e.g., display) the indication of whether or not the interaction is authorized to the communication device 102. Upon receiving the indication of whether or not the interaction is authorized, the service provider application on the communication device 102 can display the indication of whether or not the interaction is authorized to the user.

At a later time, a clearing and settlement process can occur between the data processing computer, the network processing computer 108, and the transport computer 114. In the clearing and settlement process, actual funds may be transferred from the data processing computer 106 to the transport computer 114 via the network processing computer 108.

Figure 6:
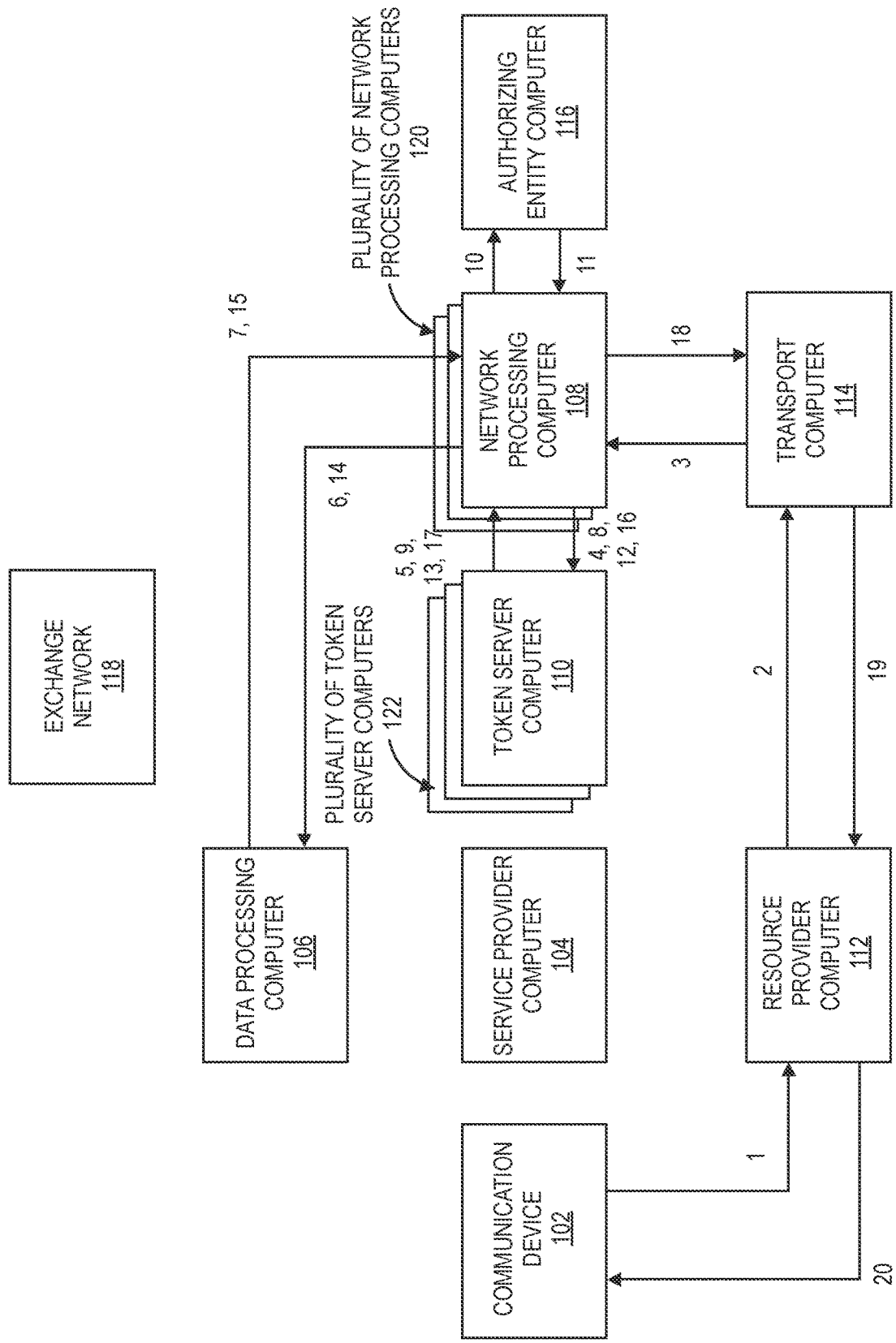
FIG. 6 shows a second interaction processing method according to embodiments.

FIG. 6 shows a second interaction processing method according to embodiments. The method illustrated in FIG. 6 will be described in the context of a user of a communication device selecting to perform a particular interaction type and addition method. For example, the interaction type illustrated in FIG. 6 is a credit account interaction. The addition method illustrated in FIG. 6 is an addition method utilizes a credit based account maintained by an authorizing entity computer and that is referenced by a second token stored by the data processing computer 106.

Steps 1-6 of FIG. 6 are similar to steps 1-6 of FIG. 5 and the descriptions therein are incorporated herein.

After receiving the authorization request message comprising the user device identifier, the interaction type, the addition method data, the amount, and the interaction data at step 6, the data processing computer 106 can verify whether or not the received user device identifier corresponds to a stored user device identifier in a database. For example, the data processing computer 106 can compare the received user device identifier to a plurality of stored user device identifiers to determine whether or not there is a match.

After determining that the user device identifier matches a stored user device identifier, the data processing computer 106 can evaluate the interaction type and the addition method data associated with the current interaction. For example, the data processing computer 106 can obtain the addition method data and the interaction type from the authorization request message. The data processing computer 106 can further process the interaction using the user device identifier and the addition method data.

For example, the addition method data can be addition method data that indicates to utilize an account maintained by the authorizing entity computer 116 during the interaction. The data processing computer can determine the addition method using the addition method data. Further, the data processing computer 106 can determine whether or not to proceed with the interaction using the addition method indicated by the addition method data.

The data processing computer 106 can then process the interaction using the addition method data. As an illustrative example, in the situation where the addition method data indicates to utilize an account maintained by the authorizing entity computer 116, the data processing computer 106 can obtain a second token (where the above mentioned token is the first token) that is associated with the account maintained by the authorizing entity computer 116.

The data processing computer 106 can store one or more tokens associated with one or more accounts for each user in a database. The one or more tokens may be used by computers that are external to the data processing computer 106 to process interactions. The data processing computer 106 can store these tokens in association with other data associated with the user (e.g., the user device identifier, the user's user account maintained by the data processing computer 106, etc.). Based on the addition method, the data processing computer can obtain the second token associated with the user device identifier or its account.

After obtaining the second token, the data processing computer 106 can generate an authorization request message, which is a second authorization request message. The initial authorization request message transmitted in step 2 can be characterized as a first authorization request message. The second authorization request message can include the second token that is associated with the addition method selected in the first transaction. The second authorization request message can also include a second amount. In some embodiments, the amount can be the same or similar to the amount included in the first authorization request message.

At step 7, after generating the authorization request message, the data processing computer 106 can provide the authorization request message to the network processing computer 108. In some embodiments, the data processing computer 106 can provide the authorization request message to a different network processing computer of the plurality of network processing computers 120 than the network processing computer 108 that processed the first transaction.

At step 8, after receiving the authorization request message, the network processing computer 108, or other network processing computer (e.g., a second network processing computer), can provide the second token of the authorization request message to the token server computer 110 in a detokenization request message. In some embodiments, if a second network processing computer of the plurality of network processing computers 120 received the authorization request message, then the second network processing computer can provide the second token to a second token server computer of the plurality of token server computers 122 or the token server computer 110.

After receiving the second token, the token server computer 110 or another token server computer can obtain a second user device identifier associated with the second token from a token database.

At step 9, after obtaining the second user device identifier, the token server computer 110 or another token server computer can provide the second user device identifier to the network processing computer 108 or the second network processing computer, depending on from which computer the second token was received.

After receiving the second user device identifier, the network processing computer 108 or the second network processing computer can modify the second authorization request message to include the second user device identifier.

At step 10, the network processing computer 108 or the second network processing computer can provide the second authorization request message to the authorizing entity computer 116.

The authorizing entity computer 116 can determine whether or not to authorize the interaction. The authorizing entity computer 116 can determine whether or not to authorize the interaction based on any suitable information. For example, the authorizing entity computer 116 can make determinations based on the interaction type, the addition type, the second user device identifier, the second amount, the interaction data, the interaction frequency of the communication device 102, the interaction frequency of the data processing computer 106, a security value determined for the interaction, etc.

The authorizing entity computer 116 can generate an indication of whether or not the interaction is authorized. The authorizing entity computer 116 can generate an authorization response message including the indication of whether or not the interaction is authorized. In some embodiments, the authorization response message can include the second amount, the second user device identifier, the interaction data, the interaction type, the addition method data, etc.

At step 11, after generating the authorization response message, the authorizing entity computer 116 can provide the authorization response message comprising at least the indication of whether or not the transaction is authorized and the user device identifier to the network processing computer 108 or the second network processing computer, depending on from which device the authorizing entity computer 116 received the second authorization request message.

At step 12, if the authorization response message includes the second user device identifier, after receiving the authorization response message from the authorizing entity computer 116, the network processing computer 108 or the second network processing computer can provide the second user device identifier to the token server computer 110 or the second token server computer in a tokenization request message.

After receiving the second user device identifier, the token server computer 110 or the second token server computer can obtain the second token based on the second user device identifier by searching through a database of tokens stored in association with user device identifiers.

At step 13, after obtaining the second token, the token server computer 110 can provide the second token to the network processing computer 108 or the second network processing computer in a tokenization response message in response to the tokenization request message.

After receiving the second token, the network processing computer 108 or the second network processing computer, can modify the authorization response message to include the second token and remove the second user device identifier.

At step 14, the network processing computer 108 or the second network processing computer can provide the authorization response message to the data processing computer 106.

After receiving the authorization response message from the network processing computer 108, the data processing computer 106 can evaluate the indication of whether or not the interaction is authorized.

The network processing computer 108 can also generate a second authorization response message that includes the indication of whether or not the interaction is authorized. The second authorization response message can also include the first amount and the first user device identifier. In some embodiments, the second authorization response message can further include the addition method data and the interaction type.

At step 15, the data processing computer 106 can provide the second authorization response message to the network processing computer 108, from which the original first authorization request message was received. In some embodiments, the data processing computer 106 can push a notification to an application associated with the data processing computer 106 stored on the communication device 102. The notification can indicate that the interaction is authorized or that the interaction is not authorized.

At step 16, after receiving the second authorization response message from the data processing computer 106, if the second authorization response message includes the first user device identifier, the network processing computer can provide the first user device identifier to the token server computer 110 in a tokenization request message that request the first token.

After receiving the first user device identifier, the token server computer 110 can obtain the first token based on the first user device identifier from a database comprising a plurality of stored user device identifiers that are respectively stored in association with a plurality of tokens.

At step 17, after obtaining the first token, the token server computer 110 can provide the first token to the network processing computer 108 in a tokenization response message.

After receiving the first token from the token server computer 110, the network processing computer 108 can modify the second authorization response message to include the first token and can remove the first user device identifier.

At step 18, after modifying the second authorization response message, the network processing computer 108 can provide the second authorization response to the transport computer 114.

At step 19, after receiving the second authorization response message from the network processing computer 108, the transport computer 114 can provide the second authorization response message to the resource provider computer 112.

At step 20, the resource provider computer 112 can then optionally provide the indication (e.g., a display) of whether or not the interaction is authorized to the communication device 102. Upon receiving the indication of whether or not the interaction is authorized, the service provider application, provided by the service provider computer 104, on the communication device 102 can display the indication of whether or not the interaction is authorized to the user.

At a later time, a clearing and settlement process can occur between the data processing computer, the network processing computer 108, and the transport computer 114. In the clearing and settlement process, actual funds may be transferred from the data processing computer 106 to the transport computer 114 via the network processing computer 108. A clearing and settlement process may also be performed between the authorizing entity computer 116, the network processing computer 108 and the data processing computer 106 so that actual funds may be transferred from the authorizing entity computer 116 to the data processing computer 106.

Figure 7:
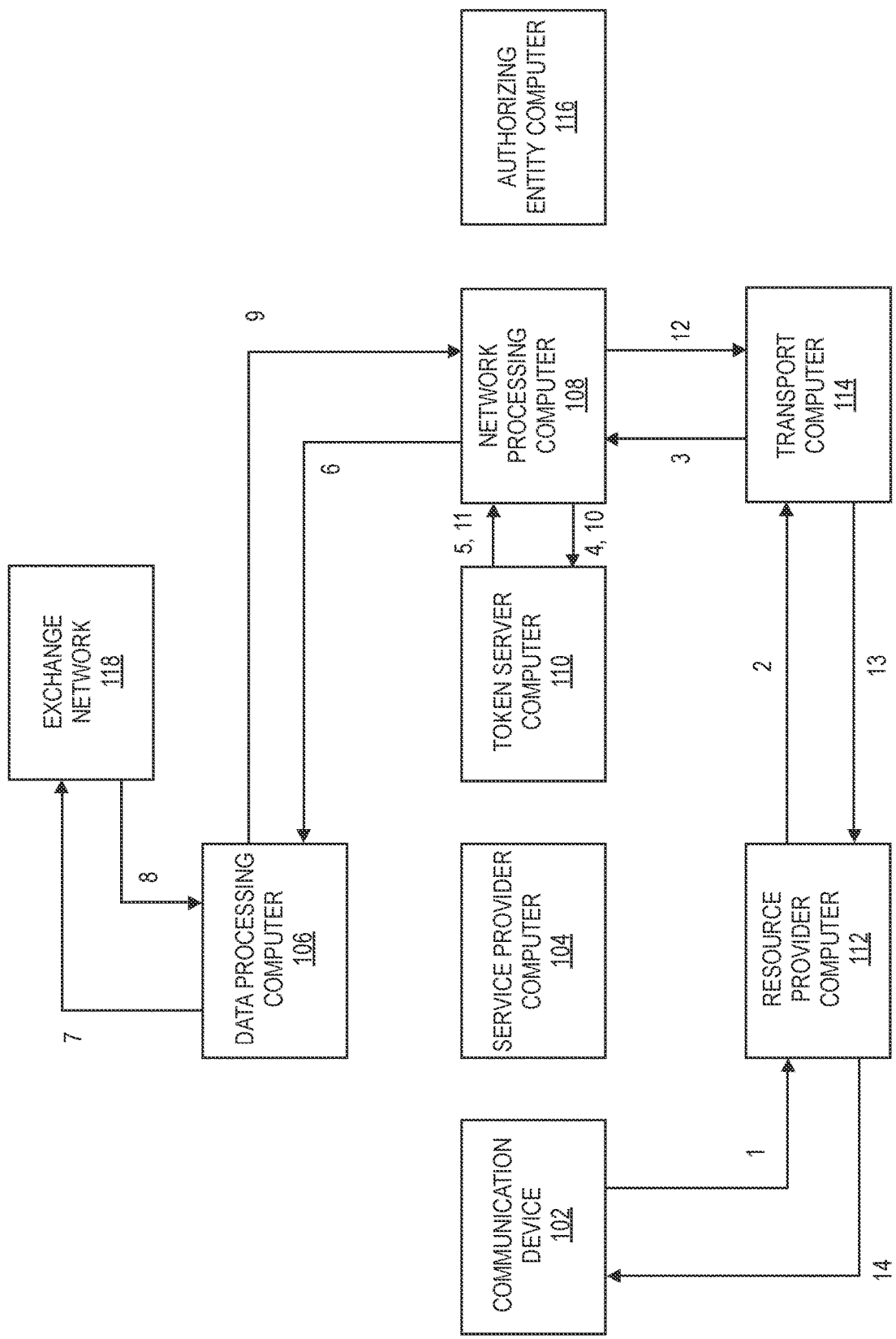
FIG. 7 shows a third interaction processing method according to embodiments.

FIG. 7 shows a second interaction processing method according to embodiments. The method illustrated in FIG. 7 will be described in the context of a user of a communication device selecting to perform a particular interaction type and addition method. For example, the interaction type illustrated in FIG. 7 is a demand account interaction. The addition method illustrated in FIG. 7 is an addition method that uses an exchange network to fund the interaction.

Steps 1-6 of FIG. 7 are similar to steps 1-6 of FIG. 5 and FIG. 6 and the descriptions therein are incorporated herein.

After receiving the authorization request message comprising the user device identifier, the interaction type, the addition method data, the amount, and the interaction data at step 6, the data processing computer 106 can determine an addition method using the addition method data. As an example, the interaction type can be a demand account interaction and the addition method can be an automated clearing house (ACH) transfer process.

After evaluating the interaction type and the addition method determined from the addition method data, the data processing computer 106 can initiate processing of the addition method. For example, the addition method that is an ACH transfer can indicate that the data processing computer 106 is to perform an ACH transfer using a stored originating account number. The originating account number can be an account number for an account maintained by a third party on behalf of the user. The ACH transfer can be utilized to transfer an amount from the originating account to the user account maintained by the data processing computer 106 (e.g., a receiving account identified by a receiving account number). The data processing computer 106 can retrieve the originating account number from a database using the user device identifier.

After obtaining the originating account number, the data processing computer 106 can generate an exchange request message comprising the amount, a user account number of the user account maintained by the data processing computer 106, and the originating account number.

In some embodiments, the originating account number corresponds with a routing number that can indicate to the exchange network 118 where to route requests relating to the originating account number. The routing number can be included in the exchange request message by the data processing computer 106.

At step 7, after generating the exchange request message, the data processing computer 106 can provide the exchange request message to the exchange network 118.

The exchange network 118 can receive the exchange request message at a routing computer (e.g., an operator computer) in the exchange network 118. The routing computer can route the exchange request message to an originating account maintaining computer in the exchange network 118 (e.g., a computer in the exchange network 118 that maintains the origination account). The originating account maintaining computer can be a financial institution computer that maintains a demand account (e.g., a checking account) of the user. The originating account maintaining computer can provide the amount included in the exchange request message. In some embodiments, the exchange network 118 can generate an exchange response message that indicates that the transfer of the amount is scheduled.

At step 8, the exchange network 118 can provide the exchange response message to the data processing computer 106 in response to the exchange request message.

After receiving the exchange response message, the data processing computer 106 can generate an authorization response message indicating that the interaction is authorized if the exchange response message indicates that the originating account maintaining computer agreed to the transfer the requested amount. If the originating account maintaining computer did not agree to the transfer, then the data processing computer 106 can generate the authorization response message indicating that the interaction is not authorized.

The authorization response message can also include the amount, the user device identifier, and the interaction data. In some embodiments, the authorization response message can further include the addition method and the interaction type.

At step 9, after generating the authorization response message, the data processing computer 106 can provide the authorization response message to the network processing computer 108.

At step 10, after receiving the authorization response message, the network processing computer 108 can provide the user device identifier to the token server computer 110 in a tokenization request message.

After receiving the user device identifier, the token server computer 110 can obtain the token using the user device identifier by searching a database comprising a plurality of tokens that are respectively stored in association with a plurality of user device identifiers.

At step 11, after obtaining the token, the token server computer 110 can provide the token to the network processing computer 108 in a tokenization response message in response to the tokenization request message.

After receiving the token, the network processing computer 108 can modify the authorization response message to include the token. The network processing computer 108 can replace the user device identifier with the token.

At step 12, after modifying the authorization response message to include the token, the network processing computer 108 can provide the authorization response message to the transport computer 114.

At step 13, after receiving the authorization response message from the network processing computer 108, the transport computer 114 can provide the authorization response message to the resource provider computer 112.

At step 14, after receiving the authorization response message, the resource provider computer 112 can provide the indication of whether or not the interaction is authorized to the communication device 102. The communication device 102 can display to indication of whether or not the interaction is authorized to the user of the communication device 102.

At the end of the day or a number of days, a clearing and settlement process can be conducted by the computers in the system (e.g., the network processing computer 108, the transport computer 114, the data processing computer 106, and the exchange network 118). In particular, funds may be moved from the originating account maintaining computer in (or external to) the exchange network 118 to the data processing computer 106. Before or after the funds are received by the data processing computer 106, funds may be transferred from the data processing computer 106 to an account of the resource provider at the transport computer 114 via the network processing computer 108.

In some embodiments, the aforementioned exchange network 118 can be a blockchain network. The blockchain network can include a plurality of nodes. The nodes of the blockchain network maintain a blockchain. The blockchain is a list of records, referred to as blocks, that are linked together using cryptographic methods. Each block can store interaction data and/or data related to an exchange (e.g., an amount, a user account number of the user account maintained by the data processing computer 106, and the originating account number, etc.). In some embodiments, the data processing computer 106 is a node that can operate within the exchange network 118.

Each block can include a cryptographic hash of the previous block in the blockchain, a timestamp, and data related to an interaction, which can be represented as a Merkle tree. The timestamp proves that the data existed when the block was published in order to be stored in the cryptographic hash. As blocks each include information about the block previous to it, they form a blockchain, with each additional block reinforcing the ones before it. Therefore, blockchains are resistant to modification of their data because once recorded, the data in any given block cannot be altered retroactively without altering all subsequent blocks.

If the exchange network 118 is a blockchain network, then after receiving the exchange request message at step 7, a receiving node of the exchange network 118 can determine whether or not to include the data of the exchange request message into the blockchain maintained by the nodes of the exchange network 118. If the receiving node of the exchange network 118 determines to add the data of the exchange request message to a block to add to the blockchain, then the receiving node can broadcast a block addition proposal message to the other nodes of the exchange network 118. The nodes of the exchange network 118 can then work to add the block to the blockchain. The nodes of the exchange network 118 can utilize any block creation method to create the block, add the data to the block, and add the block to the blockchain.

After the block that includes the data of the exchange request message is added to the blockchain (or the exchange is denied), then a node of the exchange network 118 (e.g., the receiving node) can generate an exchange response message that includes an indication of whether or not the exchange is approved. For example, the exchange response message can include an indication of whether or not data representing the interaction is included in a block that is added to the blockchain maintained by the exchange network 118.

Figure 8:
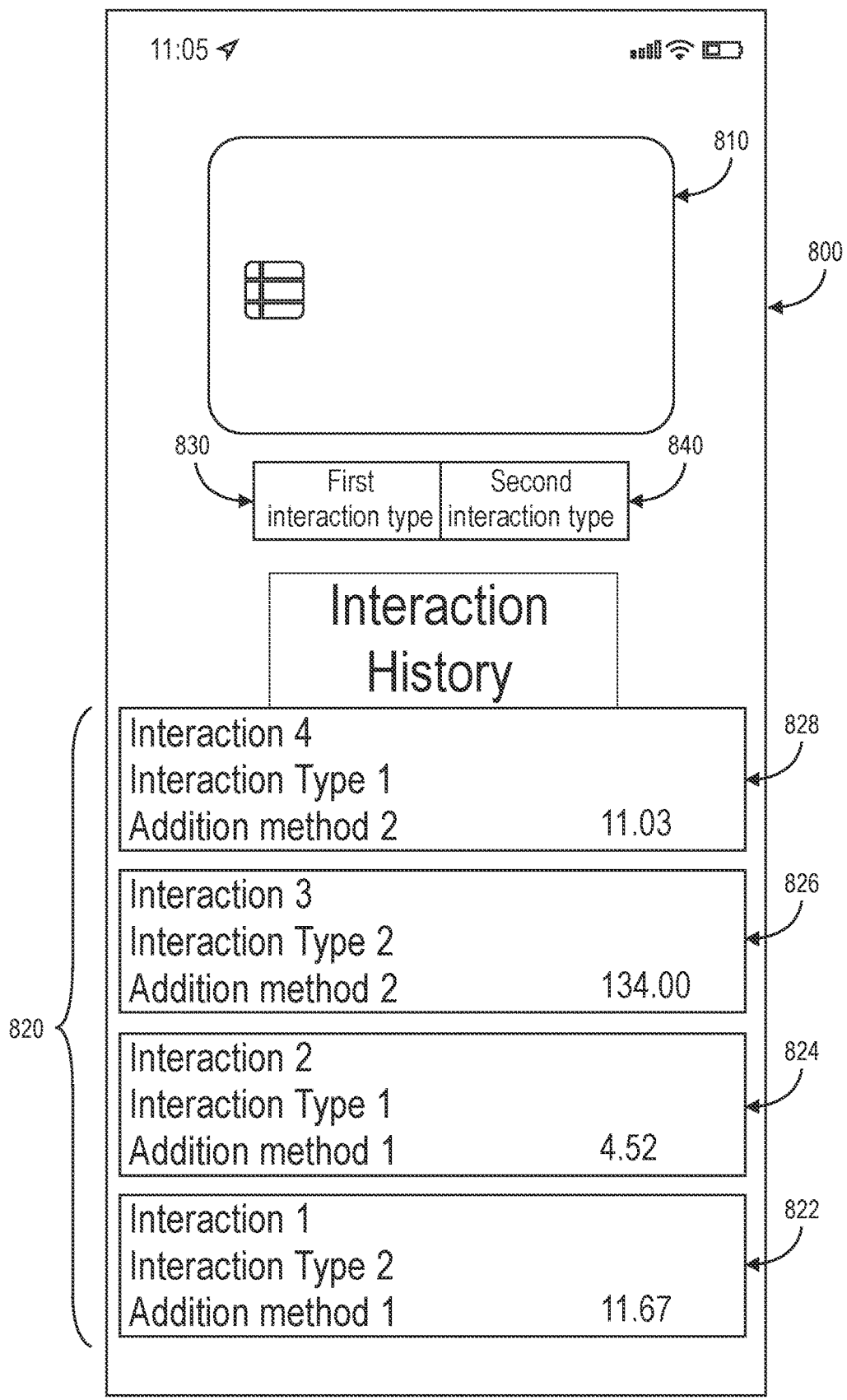
FIG. 8 shows an account history GUI according to embodiments.

FIG. 8 shows an account history graphical user interface (GUI) that can be loaded by a service provider application and rendered on a screen by a communication device that stores the service provider application. The service provider application on the communication device can allow the user to view an interaction history (e.g., an account history, a transaction history, etc.).

The GUI 800 includes a user device graphic 810 and an interaction history list 820 comprising a plurality of previous interaction details 822, 824, 826, and 828. The GUI 800 also includes a first interaction type selection button 830 and a second interaction type selection button 840.

The GUI 800 illustrates the user's interaction history in the interaction history list 820 from all interactions of each interaction type available to the user device illustrated in the user device graphic 810.

The user device graphic 810 can include details relating to the user device associated with the user device graphic 810. For example, the user device graphic 810 can display the user device identifier (or a partially masked user device identifier), the user's name, the expiration data, a code, and/or account information. As an illustrative example, the user device graphic 810 can display user device identifier text of "0123456789123456," user name text of "Jane Doe," expiration data text of "01/01/2025," and code text of "777."

The interaction history list 820 can include the plurality of previous interaction details for a first interaction 822, a second interaction 824, a third interaction 826, and a fourth interaction 828 of each previous interaction. Each previous interaction can indicate an interaction type, an addition method, and an amount. For example, the first interaction 822 includes an interaction type of type 2, an addition method of type 1, and an amount of 11.67.

The first interaction type selection button 830 and the second interaction type selection button 840 can allow the user of the communication device to filter the interaction history list 820 by the interaction type. For example, the first interaction type selection button 830 can allow the GUI 800 to display the interaction history list 820 including only interactions that utilized the first interaction type. As such, the interaction history list 820 can include the second interaction 824 and the fourth interaction 828 when the first interaction type selection button 830 is selected.

As an additional example, the second interaction type selection button 840 can allow the GUI 800 to display the interaction history list 820 including only interactions that utilized the second interaction type. As such, the interaction history list 820 can include the first interaction 822 and the third interaction 826 when the second interaction type selection button 840 is selected.

The first interaction type selection button 830 and the second interaction type selection button 840 indicate that the user can select between two different interaction types, however, it is understood that there may be more than two interaction types. The communication device can display previous interactions that were performed with the selected transaction type. As such, the user device (e.g., a payment card) can act like a single credential in the service provider application, but may be associated with the multiple tokens for initiating the different interaction types.

Figure 9A:
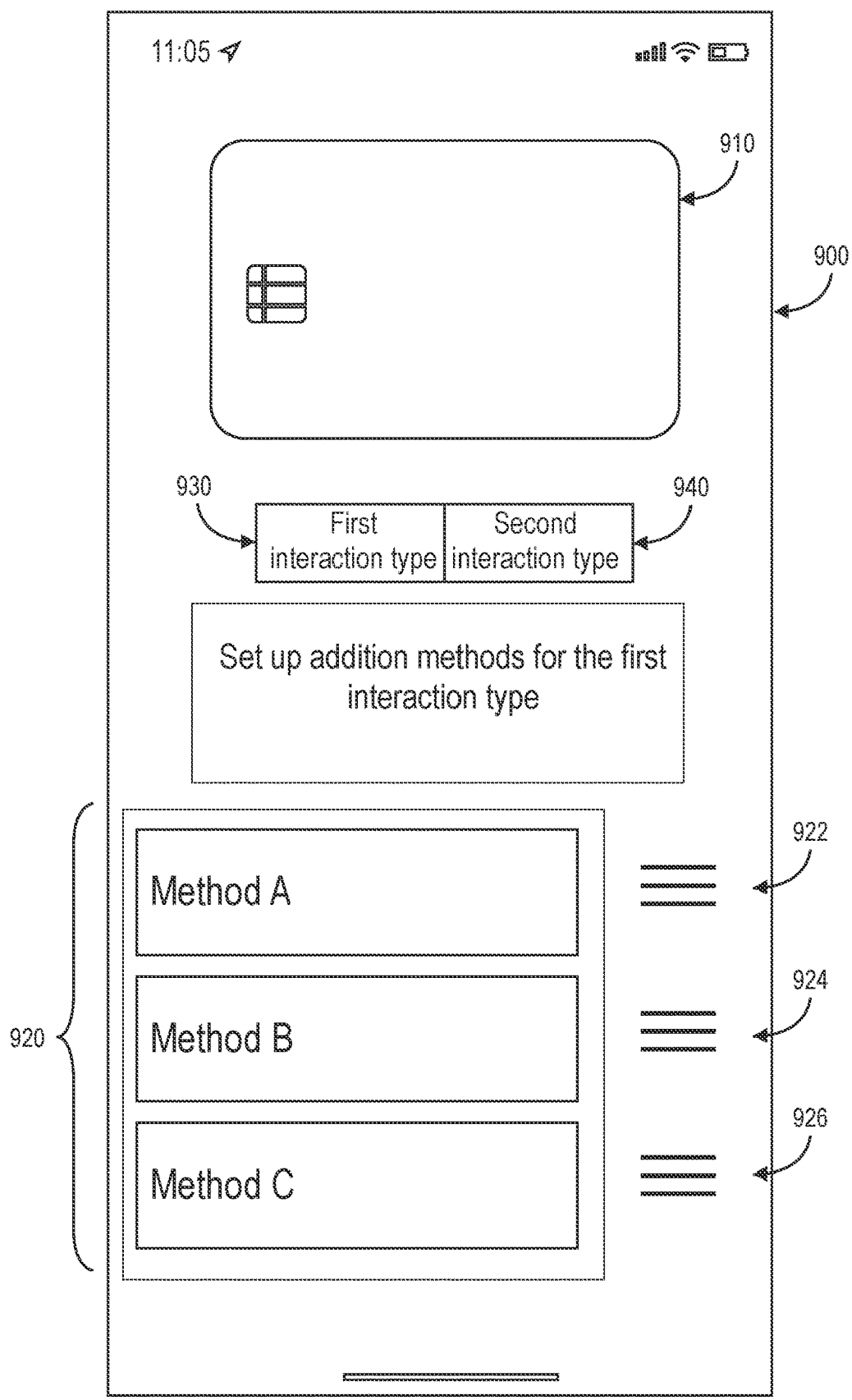
FIGS. 9A and 9B show a GUI illustrating various selection options provided to a user according to embodiments.
Figure 9B:
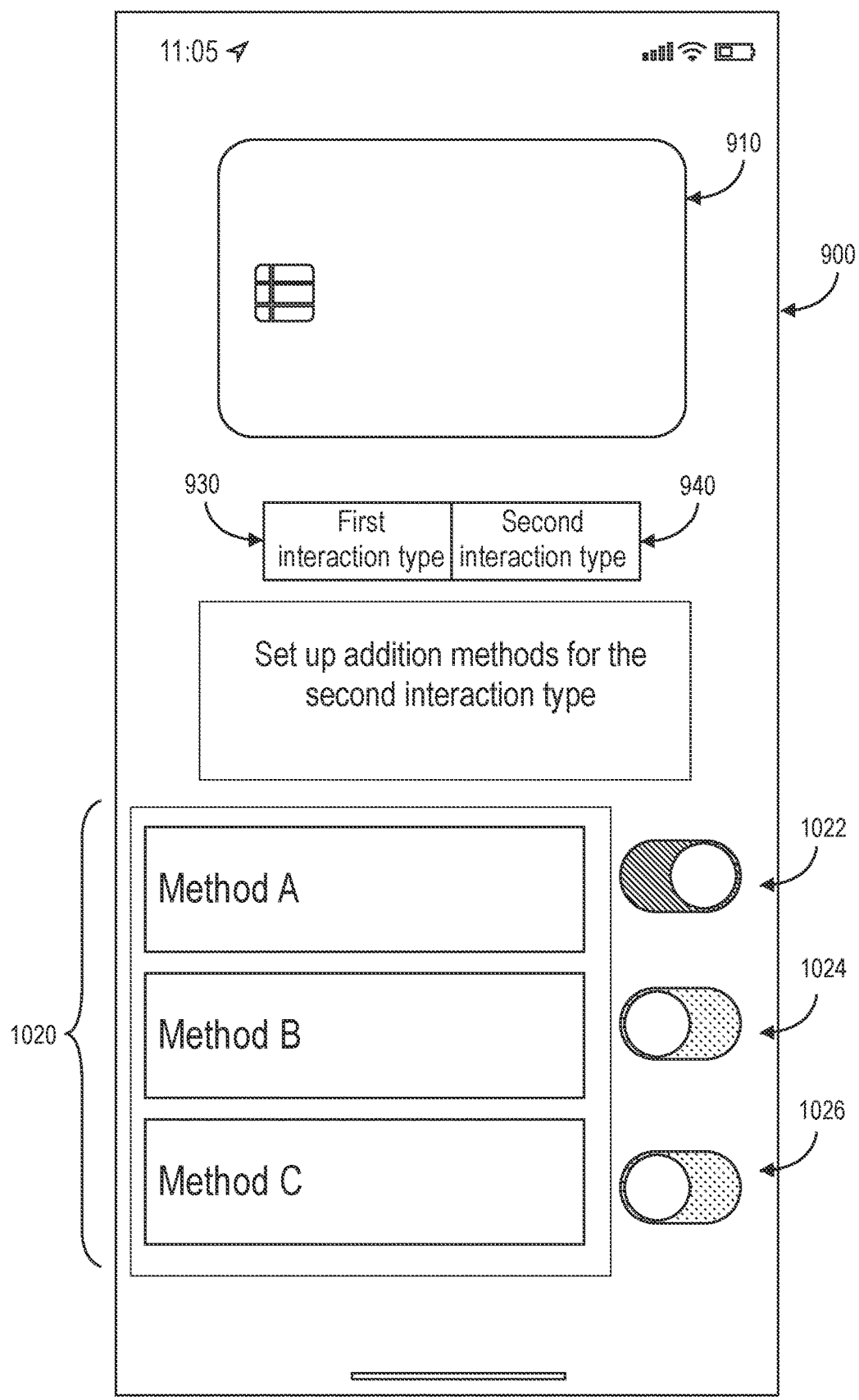

FIGS. 9A and 9B show a GUI illustrating various selection options provided to a user according to embodiments. FIG. 9A includes a GUI 900 that includes a user device graphic 910 and an addition method list 920 that includes addition method A 922, addition method B 924, and addition method C 926. The GUI 900 also includes a first interaction type selection button 930 and a second interaction type selection button 940. FIG. 9B includes a GUI 1000 that includes a user device graphic 1010 and an addition method list 1020 that includes addition method A 1022, addition method B 1024, and addition method C 1026. The GUI 1000 also includes a first interaction type selection button 1030 and a second interaction type selection button 1040.

The GUI 900 and the GUI 1000 illustrate various options and preferences available to a user, which can affect how an interaction is processed. For example, the GUI 900 illustrates an addition method preferences selection screen for interaction of a first interaction type. For example, the communication device can allow the user to rearrange the order in which the addition methods of addition method A 922, addition method B 924, and addition method C 926 are included in the addition method list 920. In particular, the GUI 900 illustrates that currently the default (e.g., first listed) addition method for the first interaction type is addition method A 922. The secondary default addition method is addition method B 924. The tertiary default addition method is addition method C 926.

As an illustrative example, the first interaction type, as selected by the first interaction type selection button 930, can be a demand account interaction type. The second interaction type selection button 940 can bring the user to GUI 1000. The addition method A 922 can be an addition method that indicates to utilize an account maintained by the data processing computer. As illustrated in the GUI 900, the addition method A 922 can be the default, or first attempted, addition method when an interaction of the interaction type is performed. In some embodiments, if the first addition type cannot be performed, then during interaction processing, the data processing computer can obtain the second listed default addition method from the communication device. The second listed default addition method is addition method B 924 as illustrated in the GUI 900. As an example, the addition method B 924 can be an addition method that indicates to utilize a first account maintained by an authorizing entity computer. Further, the addition method C 926 can be an addition method that indicates to utilize a second account maintained by the authorizing entity computer.

Referring to FIG. 9B, the GUI 1000 illustrates addition method preferences selection screen for second interaction types. For example, the communication device can allow the user to select one of a plurality of addition methods as a default addition method. In particular, the GUI 1000 illustrates three example addition methods presented to the user of the communication device, which include the addition method A 1022, the addition method B 1024, and the addition method C 1026. The user can select a default addition method using a toggle option. The user can select the default addition method and/or the ordering of the addition methods in any suitable manner including toggle options (as depicted in GUI 1000), option ordering (as depicted in GUI 900), option ordering via conditional statements, etc.

As an illustrative example, the GUI 1000 can display the addition methods for the second interaction type, as selected by the second interaction type selection button 1040. The first interaction type selection button 1030 can bring the user to GUI 900. The second interaction type can be a credit account interaction. The addition method A 1022 can be an installments addition method, the addition method B 1024 can be a charge card addition method, and the addition method C 1026 can be a credit line addition method. During an interaction, the default addition method for the second interaction type can be an installments addition method (e.g., setting up an installment plan where the user makes three equal payments at specified intervals) since the addition method A 1022 is selected to be the default addition method. In some embodiments, the service provider application is programmed to use the plurality of addition methods in a particular order.

Embodiments allow multiple tokens to be associated with a single user device identifier. This enables the user to select various interaction types while using a single user device identifier. Furthermore, the user can select an addition method when initiating an interaction, rather than needing to access additional accounts to obtain additional user device identifiers with different options to fund the user's account prior to performing the interaction.

Embodiments of the disclosure have a number of advantages. For example, embodiments allow a user to perform an interaction with a user account that may not have enough of an amount (e.g., funds) in the user account to cover the interaction. Addition method data selected during the interaction can be used to perform a pass through interaction where an amount can be provided from a second account external to the user account. The amount may then be provided from the user account to the resource provider with which the user is interacting.

Embodiments provide for a number of additional advantages. For example, a user does not need to provide their user device identifier to a resource provider during an online interaction, thus keeping the user device identifier secure from potentially malicious resource providers. Furthermore, the resource provider does not receive any sensitive data related to the addition method, such as second tokens.

Additionally, embodiments provide interaction type flexibility to users. The user can select a single user device to be used during either a demand account interaction or a credit account interaction.

Furthermore, embodiments provide for the advantage of introducing new interaction types to an existing user device without the need to issue a new user device. For example, a user device may be associated with a single first token stored on a communication device that is associated with a first interaction type. The service provider computer, in conjunction with the token server computer, can create a second token that is associated with a second interaction type. The second token can be provided to the communication device, which can store the second token along with the first token. The credentials of the user device do not need to change in order for the user to interact using the second token to perform a second interaction type that is different from the first interaction type.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

generating, by a token server computer, a plurality of tokens for a user device identifier associated with a user, the plurality of tokens including a first token and a second token;

assigning, by the token server computer, a first interaction type of a plurality of interaction types to the first token and a second interaction type of the plurality of interaction types to the second token, wherein the second interaction type is different from the first interaction type;

associating, by the token server computer, the first token with a first set of predetermined addition methods and the second token with a second set of predetermined addition methods, the first set of predetermined addition methods comprising a first addition method indicating to use a user account maintained by a data processing computer or an authorizing entity computer and a second addition method indicating to use an additional account maintained by a computer different from the data processing computer;

receiving, by the token server computer from a network processing computer, a detokenization request message comprising the first token, the detokenization request message being generated in response to an authorization request message received by the network processing computer for an interaction associated with the first token and initiated using a communication device operated by the user;

detokenizing, by the token server computer, the first token to determine the user device identifier and determine that the interaction type for the initiated interaction corresponds to the first interaction type that is associated with the first token;

transmitting, by the token server computer to the network processing computer, a detokenization response message comprising the user device identifier and the first interaction type;

receiving, by the data processing computer from the network processing computer, the authorization request message for the initiated interaction, the authorization request message comprising the user device identifier, the first interaction type, addition method data for the interaction, and an amount for the interaction;

verifying, by the data processing computer, the user device identifier, by comparing the user device identifier with a stored user device identifier stored in a database of the data processing computer and determining that the user device identifier matches the stored user device identifier;

based on the verifying the user device identifier, determining, by the data processing computer using the addition method data, to use the first addition method;

determining, by the data processing computer, whether the user account includes a stored amount that exceeds the amount; and performing, by the data processing computer, one from among:

if the stored amount exceeds the amount, applying the amount to the user account, and if the stored amount does not exceed the amount, determining that the second addition method is to be used and applying at least a portion of the amount to the additional account.

2. The method of claim 1, wherein the stored amount exceeds the amount, the first addition method indicates to use the user account maintained by the data processing computer, and the method further comprises:

authorizing, by the data processing computer, the interaction.

3. The method of claim 2, further comprising:

generating, by the data processing computer, an authorization response message comprising the user device identifier; and providing, by the data processing computer, the authorization response message to the network processing computer as a response to the authorization request message.

4. The method of claim 1, wherein the stored amount exceeds the amount, wherein the first addition method indicates to use the user account maintained by the authorizing entity computer, wherein the authorization request message is a first authorization request message, and wherein the method further comprises:

based on the first addition method, obtaining, by the data processing computer, a third token associated with the user device identifier, wherein the third token is obtained from a database;

generating, by the data processing computer, a second authorization request message comprising the third token and the amount; and providing, by the data processing computer, the second authorization request message to the network processing computer.

5. The method of claim 4, further comprising:

inserting, by the network processing computer, the user device identifier into the second authorization request message;

transmitting, by the data processing computer, the second authorization request message to the authorizing entity computer, wherein receiving the second authorization request message causes the authorizing entity computer to determine whether or not to authorize the interaction, generate an authorization response message comprising an indication of whether or not the interaction is authorized, and provide the authorization response message to the data processing computer; and receiving, by the data processing computer, the authorization response message from the authorizing entity computer.

6. The method of claim 1, wherein the authorization request message is a first authorization request message and wherein the method further comprises:

based on the first addition method, obtaining, by the data processing computer, a third token associated with the user device identifier, wherein the third token is obtained from a database;

generating, by the data processing computer, a second authorization request message comprising the third token and the amount; and providing, by the data processing computer, the second authorization request message to the network processing computer.

7. The method of claim 1, wherein the stored amount does not exceed the amount and the method further comprises:

based on the second addition method, obtaining, by the data processing computer, an additional account number using the user device identifier, the additional account number identifying an originating account maintained by the computer in an exchange network on behalf of the user, the originating account being the additional account;

obtaining, by the data processing computer, a receiving account number that identifies a receiving account maintained by the data processing computer on behalf of the user;

generating, by the data processing computer, an exchange request message comprising the amount, the receiving account number, and the additional account number;

providing, by the data processing computer, the exchange request message to the exchange network; and receiving, by the data processing computer, an exchange response message indicating whether or not the interaction is authorized.

8. The method of claim 7 further comprising:
generating, by the data processing computer, an authorization response message comprising an indication of whether or not the interaction is authorized; and
providing, by the data processing computer, the authorization response message to the network processing computer.

9. The method of claim 1, wherein the user device identifier is an interaction card number.

10. The method of claim 1, wherein the data processing computer is a node in a blockchain network.

11. The method of claim 1, wherein:
the first addition method indicates to use the user account maintained by the data processing computer,
the stored amount does not exceed the amount, and
the method further comprises:
transmitting, by the data processing computer to a blockchain network comprising a plurality of nodes managing a blockchain, an exchange request message comprising an exchange request data including the amount, a number of the user account, and a number of the additional account,
receiving, by a node of the blockchain network, the exchange request message,
determining, by the node of the blockchain network, whether to add a block including the exchange request data to the blockchain, and
in response to the determining to add to the block, broadcasting, by the node of the blockchain network, a block addition proposal to the plurality of nodes that causes the plurality of nodes to cooperate to add the block to the blockchain.

12. A system comprising:
a token server computer; and
a data processing computer comprising a processor, and a computer-readable medium coupled to the processor,
wherein the token server computer configured to:
generate a plurality of tokens for a user device identifier associated with a user, the plurality of tokens including a first token and a second token;
assign a first interaction type of a plurality of interaction types to the first token and a second interaction type of the plurality of interaction types to the second token, wherein the second interaction type is different from the first interaction type;
associate the first token with a first set of predetermined addition methods and the second token with a second set of predetermined addition methods, the first set of predetermined addition methods comprising a first addition method indicating to use a user account maintained by the data processing computer or an authorizing entity computer and a second addition method indicating to use an additional account maintained by a computer different from the data processing computer;

receive, from a network processing computer, a detokenization request message comprising the first token, the detokenization request message being generated in response to an authorization request message received by the network processing computer for an interaction associated with the first token and initiated using a communication device operated by the user;

detokenize the first token to determine the user device identifier and determine that the interaction type for the initiated interaction corresponds to the first interaction type that is associated with the first token; and transmit, to the network processing computer, a detokenization response message comprising the user device identifier and the first interaction type;

wherein the computer-readable medium comprises code that, when executed by the processor, causes the processor to perform operations including:
receiving, from the network processing computer, the authorization request message for the initiated interaction, the authorization request message comprising the user device identifier, the first interaction type, addition method data for the interaction, and an amount for the interaction, verifying the user device identifier, by comparing the user device identifier with a stored user device identifier stored in a database of the data processing computer and determining that the user device identifier matches the stored user device identifier;

based on the verifying the user device identifier, determining, using the addition method data, to use the first addition method;

determining whether the user account includes a stored amount that exceeds the amount; and performing one from among:
if the stored amount exceeds the amount, applying the amount to the user account, and
if the stored amount does not exceed the amount, determining that the second addition method is to be used and applying at least a portion of the amount to the additional account.

13. The system of claim 12, wherein the stored amount exceeds the amount, the first addition method indicates to use the user account maintained by the data processing computer, and the operations further include:
authorizing the interaction;
generating an authorization response message comprising the user device identifier; and
providing the authorization response message to the network processing computer as a response to the authorization request message.

14. The system of claim 12, wherein the stored amount exceeds the amount, wherein the authorization request message is a first authorization request message, and wherein the operations further include:
based on the first addition method, obtaining a third token associated with the user device identifier, wherein the third token is obtained from a database;
generating a second authorization request message comprising the third token and the amount;
providing the second authorization request message to the network processing computer;

inserting the user device identifier into the second authorization request message;
transmitting the second authorization request message to the authorizing entity computer; and
receiving an authorization response message comprising an indication of whether or not the interaction is authorized from the authorizing entity computer.

15. The system of claim 12, wherein the stored amount does not exceed the amount and the operations further include:
based on the second addition method, obtaining an additional account number using the user device identifier, the additional account number identifying an originating account maintained by the computer in an exchange network on behalf of the user, the originating account being the additional account;
obtaining a receiving account number that identifies a receiving account maintained by the data processing computer on behalf of the user;
generating an exchange request message comprising the amount, the receiving account number, and the additional account number;
providing the exchange request message to the exchange network;
receiving an exchange response message indicating whether or not the interaction is authorized;
generating an authorization response message comprising an indication of whether or not the interaction is authorized; and
providing the authorization response message to the network processing computer.

16. The system of claim 15, wherein the exchange network is a blockchain network and wherein the exchange response message includes an indication of whether or not data representing the interaction is included in a block that is added to a blockchain maintained by the exchange network.

17. The system of claim 16, wherein the data processing computer is a node in the blockchain network.

18. The system of claim 12, wherein the user device identifier is a user account number that identifies the user account maintained by the data processing computer on behalf of the user of the communication device performing the interaction with a resource provider computer.

19. The system of claim 12, wherein the authorization request message includes interaction data created by a resource provider computer.

20. The system of claim 12, further comprising the network processing computer.

* * * * *